(12) United States Patent
Tay

(10) Patent No.: US 12,486,885 B2
(45) Date of Patent: Dec. 2, 2025

(54) TOOTHED CVT FOR WHICH TEETH RE-ENGAGEMENT IS IMPROVED

(71) Applicant: Armin Sebastian Tay, Rowland Heights, CA (US)

(72) Inventor: Armin Sebastian Tay, Rowland Heights, CA (US)

( * ) Notice: Subject to any disclaimer, the term of this patent is extended or adjusted under 35 U.S.C. 154(b) by 617 days.

(21) Appl. No.: 17/440,717

(22) PCT Filed: Mar. 20, 2020

(86) PCT No.: PCT/US2020/023854
§ 371 (c)(1),
(2) Date: Sep. 17, 2021

(87) PCT Pub. No.: WO2020/198007
PCT Pub. Date: Oct. 1, 2020

(65) Prior Publication Data
US 2022/0170535 A1    Jun. 2, 2022

(51) Int. Cl.
*F16H 9/08* (2006.01)
*F16H 7/08* (2006.01)
(Continued)

(52) U.S. Cl.
CPC .............. *F16H 9/08* (2013.01); *F16H 7/12* (2013.01); *F16H 7/1254* (2013.01);
(Continued)

(58) Field of Classification Search
CPC ..... F16H 9/08; F16H 9/24; F16H 9/00; F16H 2009/245; F16H 55/52; F16H 9/16;
(Continued)

(56) References Cited

U.S. PATENT DOCUMENTS

| 691,538 A | * | 1/1902 | Frigerio | ..................... F16H 7/02 474/131 |
| 1,738,552 A | * | 12/1929 | Abbott | ....................... F16H 9/24 474/43 |

(Continued)

FOREIGN PATENT DOCUMENTS

| CN | 109519509 A | * | 3/2019 | ............... F16H 9/24 |
| EP | 1311777 B1 | | 10/2010 | |

(Continued)

*Primary Examiner* — Anna M Momper
*Assistant Examiner* — Raveen J Dias

(57) ABSTRACT

A toothed CVT using a Cone with One Torque Transmitting Member that is coupled by a Transmission Belt to another Cone with One Torque Transmitting Member for which teeth re-engagement between the Torque Transmitting Members and their Transmission Belt is improved. Said CVT uses a slack-side Tensioning Pulley in order to maintain the tension in the slack-side of the Transmission Belt almost constant so as to ensure smooth re-engagement of the Driven Cone; and a Transmission Diameter Compensating Mechanism, which increases the Transmission Diameter of the Driving Cone when the torque being pulled by the Driving Cone is increased, in order to compensate for an increase in "Transmission Belt Teeth Compression" and an increase in "stretching of the tense-side of the Transmission Belt", due to an increase in tension in the tense-side of the Transmission Belt when an increased torque is transmitted; to ensure smooth re-engagement of the Driving Cone.

1 Claim, 28 Drawing Sheets

(51) Int. Cl.
*F16H 7/12* (2006.01)
*F16H 9/24* (2006.01)

(52) U.S. Cl.
CPC ............. *F16H 7/1263* (2013.01); *F16H 9/24* (2013.01); *F16H 2007/0806* (2013.01); *F16H 2007/0865* (2013.01); *F16H 2007/0874* (2013.01); *F16H 2007/0891* (2013.01)

(58) Field of Classification Search
CPC ... F16H 9/04; F16H 9/12; F16H 9/125; F16H 9/14; F16H 9/18; F16H 9/20; F16H 2009/163; F16H 2009/166; F16H 7/00; F16H 7/02; F16H 7/06; F16H 7/08; F16H 2007/0863; F16H 2007/0865; F16H 2007/0874; F16H 2007/0806; F16H 2007/0808; F16H 2007/0891
USPC .................................... 474/83, 77, 137, 138
See application file for complete search history.

(56) References Cited

U.S. PATENT DOCUMENTS

| | | | | |
|---|---|---|---|---|
| 2,941,409 A * | 6/1960 | Witt | ............... | F16H 9/08 474/83 |
| 3,575,058 A * | 4/1971 | Kraus | ............... | F16H 9/00 474/134 |
| 3,640,145 A * | 2/1972 | Kraus | ............... | F16H 7/1281 474/245 |
| 3,913,410 A * | 10/1975 | Ackerman | ............... | F16H 55/54 474/84 |
| 4,380,444 A * | 4/1983 | Dolza | ............... | F16H 9/12 474/30 |
| 4,655,733 A * | 4/1987 | Jonason | ............... | F16H 7/023 474/251 |
| 4,934,989 A * | 6/1990 | Furukawa | ............... | F16H 7/1281 474/135 |
| 4,969,856 A * | 11/1990 | Miyata | ............... | F16H 9/18 474/11 |
| 5,938,551 A * | 8/1999 | Warner | ............... | F16H 7/1263 474/111 |
| 5,957,794 A * | 9/1999 | Kerr | ............... | B62M 9/04 474/122 |
| 6,314,877 B1 * | 11/2001 | Takasawa | ............... | B41L 13/04 101/115 |
| 6,592,481 B2 * | 7/2003 | Sato | ............... | F16H 7/023 474/134 |
| 6,656,070 B2 | 12/2003 | Tay | | |
| 6,743,131 B1 * | 6/2004 | Walker | ............... | F16H 7/08 474/134 |
| 7,419,447 B2 * | 9/2008 | Serkh | ............... | F16H 7/1218 474/134 |
| 7,713,153 B2 * | 5/2010 | Naude | ............... | F16H 9/24 474/49 |
| 7,722,490 B2 | 5/2010 | Tay | | |
| 8,353,795 B2 * | 1/2013 | Montani | ............... | F16H 7/1281 474/134 |
| 8,628,439 B2 * | 1/2014 | Tay | ............... | F16H 9/00 474/83 |
| 9,028,350 B2 * | 5/2015 | Cho | ............... | F16H 37/0846 474/47 |
| 9,551,401 B2 * | 1/2017 | Ellicott | ............... | F16H 37/12 |
| 9,651,123 B2 * | 5/2017 | Tay | ............... | F16H 9/08 |
| 9,958,064 B2 * | 5/2018 | Tay | ............... | F16H 63/065 |
| 9,964,209 B2 | 5/2018 | Tay | | |
| 2002/0039943 A1 * | 4/2002 | Serkh | ............... | F16H 7/1218 474/134 |
| 2002/0151396 A1 * | 10/2002 | Fragnito | ............... | F16H 15/18 474/83 |
| 2008/0214345 A1 * | 9/2008 | Khan | ............... | F16H 9/24 474/231 |
| 2014/0235389 A1 * | 8/2014 | Tay | ............... | F16H 7/12 474/137 |
| 2015/0126316 A1 * | 5/2015 | Tay | ............... | F16H 9/08 474/162 |
| 2016/0123437 A1 * | 5/2016 | Tay | ............... | F16H 9/08 474/69 |
| 2016/0178035 A1 * | 6/2016 | Tay | ............... | F16H 9/08 474/148 |
| 2016/0201790 A1 * | 7/2016 | Shibata | ............... | F16H 57/0489 474/8 |
| 2016/0334014 A1 * | 11/2016 | Tay | ............... | F16H 61/16 |
| 2018/0335107 A1 | 11/2018 | Tay | | |
| 2019/0120344 A1 * | 4/2019 | Kim | ............... | F16H 7/1263 |
| 2020/0182335 A1 | 6/2020 | Tay | | |

FOREIGN PATENT DOCUMENTS

| | | | | |
|---|---|---|---|---|
| EP | 2764279 B1 | 1/2018 | | |
| GB | 2084689 A * | 4/1982 | ............... | F16H 7/0827 |
| WO | WO-2005119091 A1 * | 12/2005 | ............... | F16H 55/54 |
| WO | WO2019212978 A1 | 11/2019 | | |

* cited by examiner

PRIOR ART

PRIOR ART

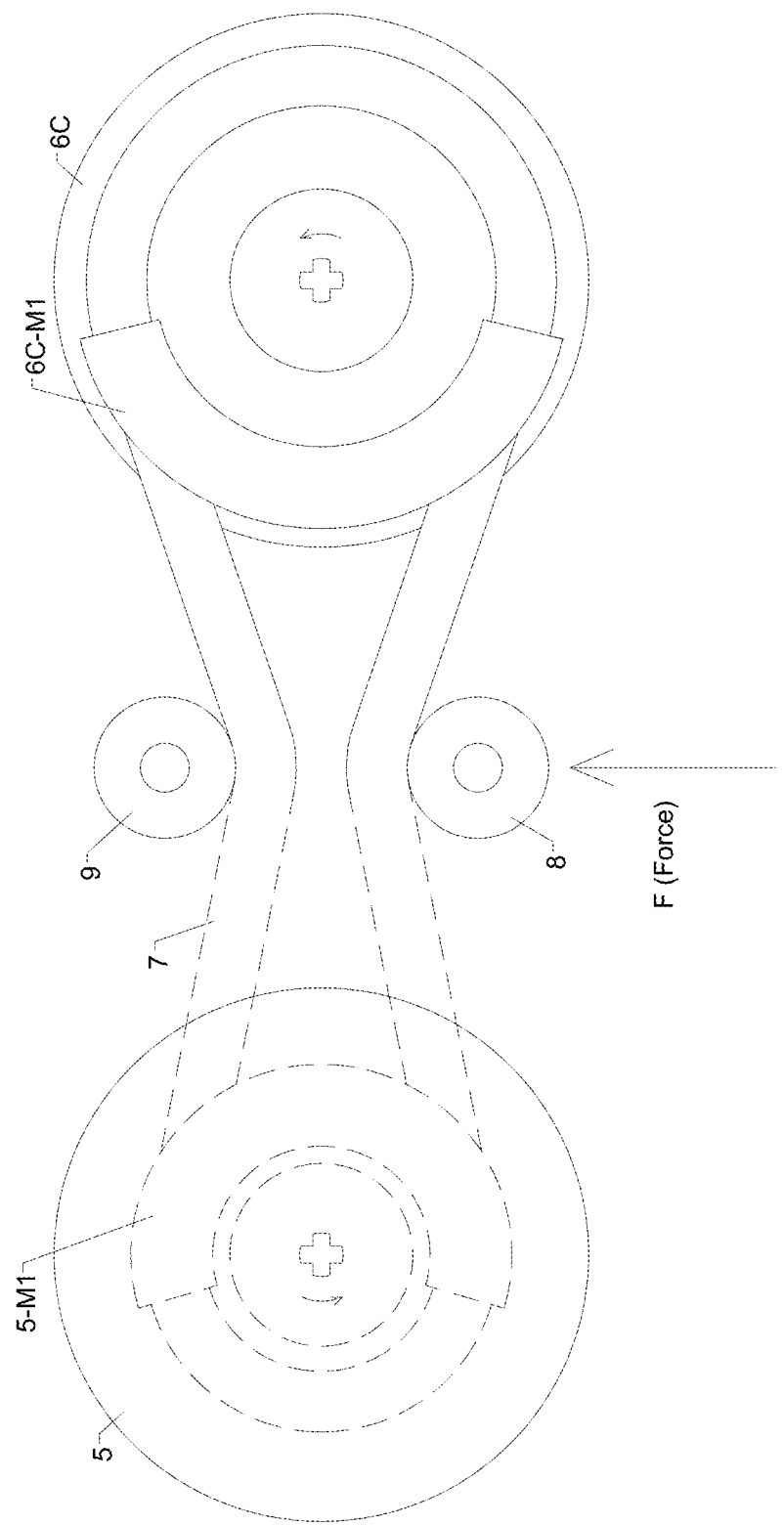

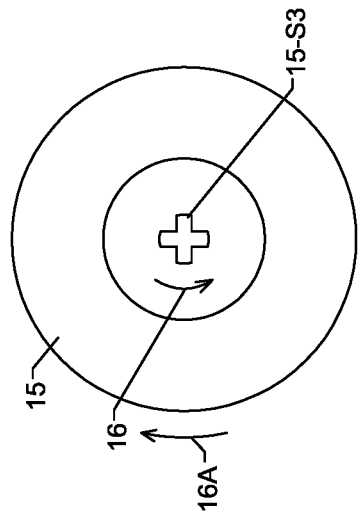
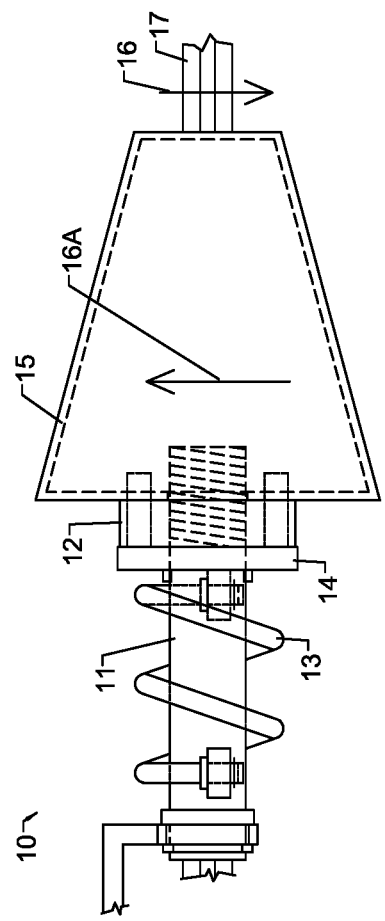

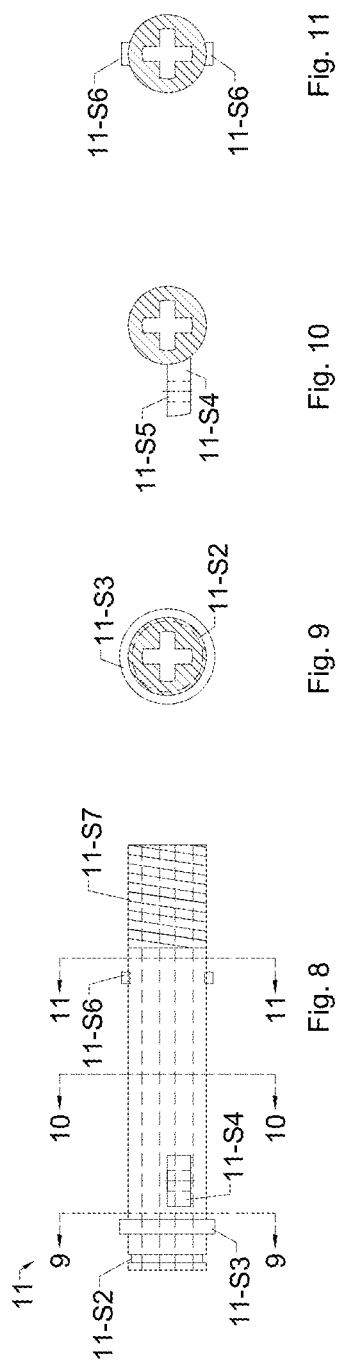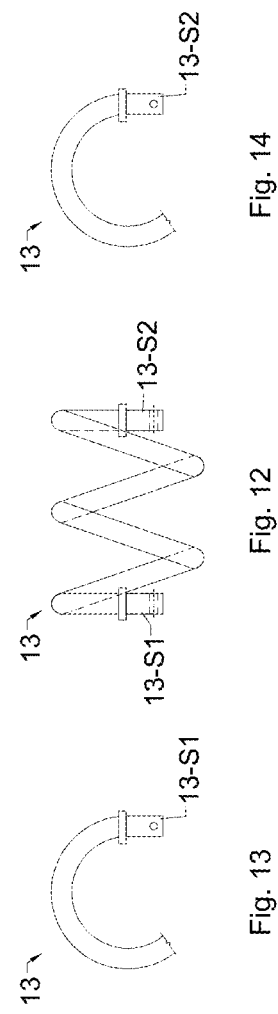

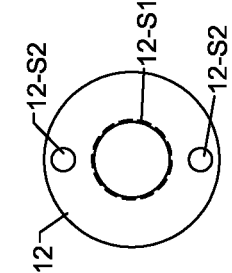
Fig. 18
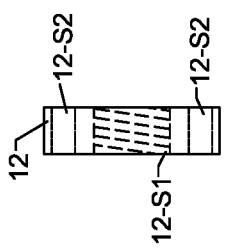
Fig. 17
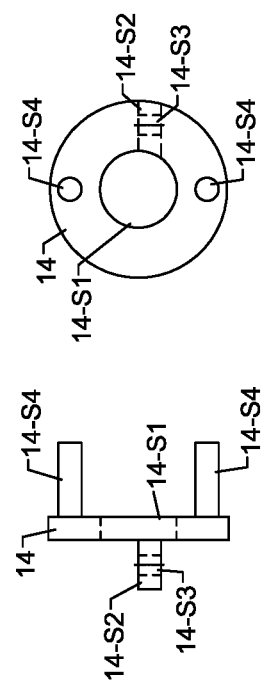
Fig. 16
Fig. 15
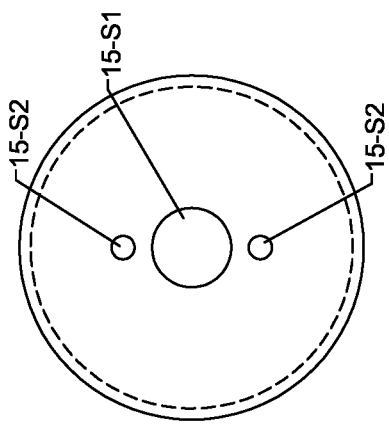
Fig. 19

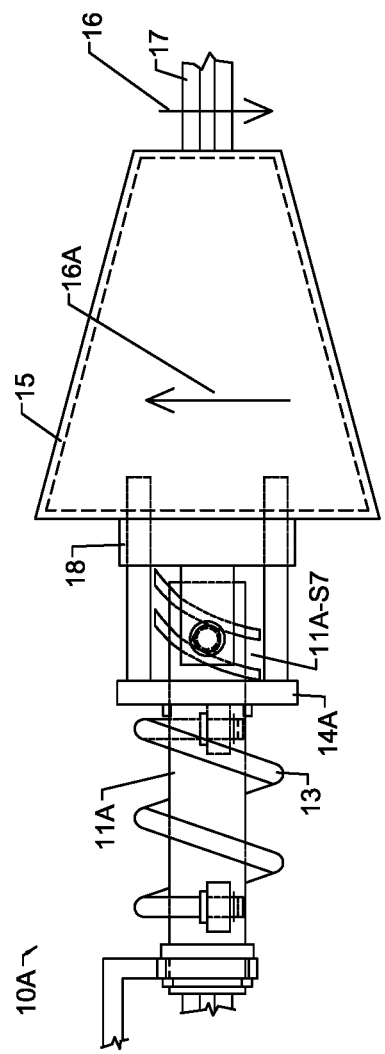

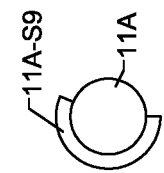
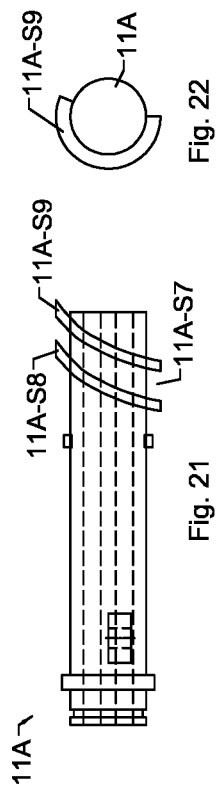
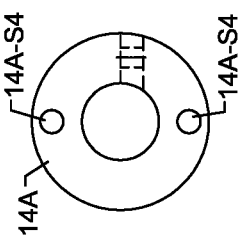
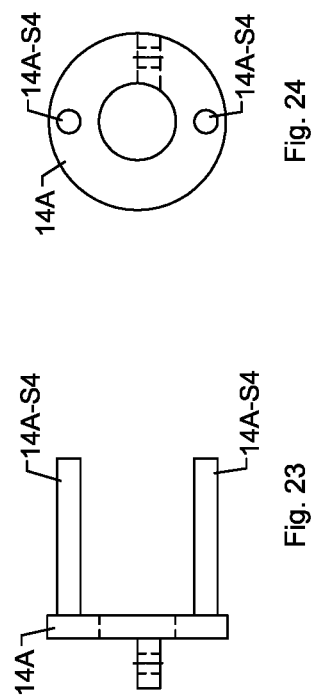

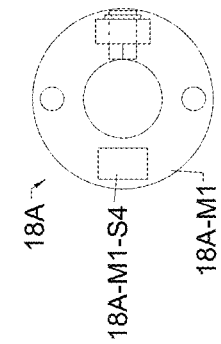
Fig. 31
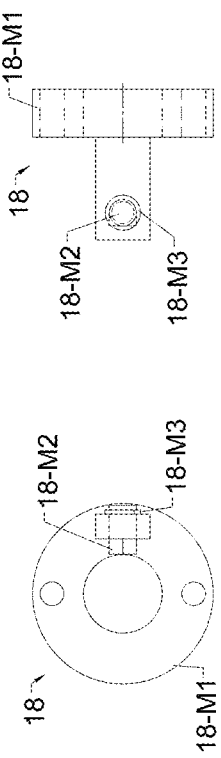
Fig. 25
Fig. 26
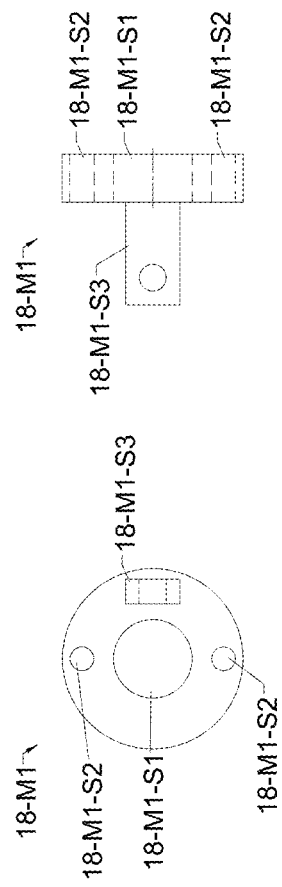
Fig. 27
Fig. 28
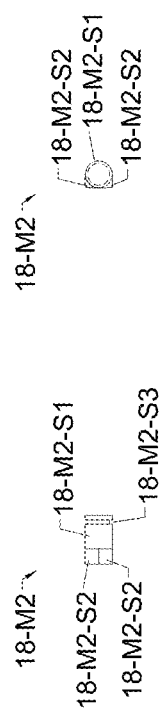
Fig. 29
Fig. 30

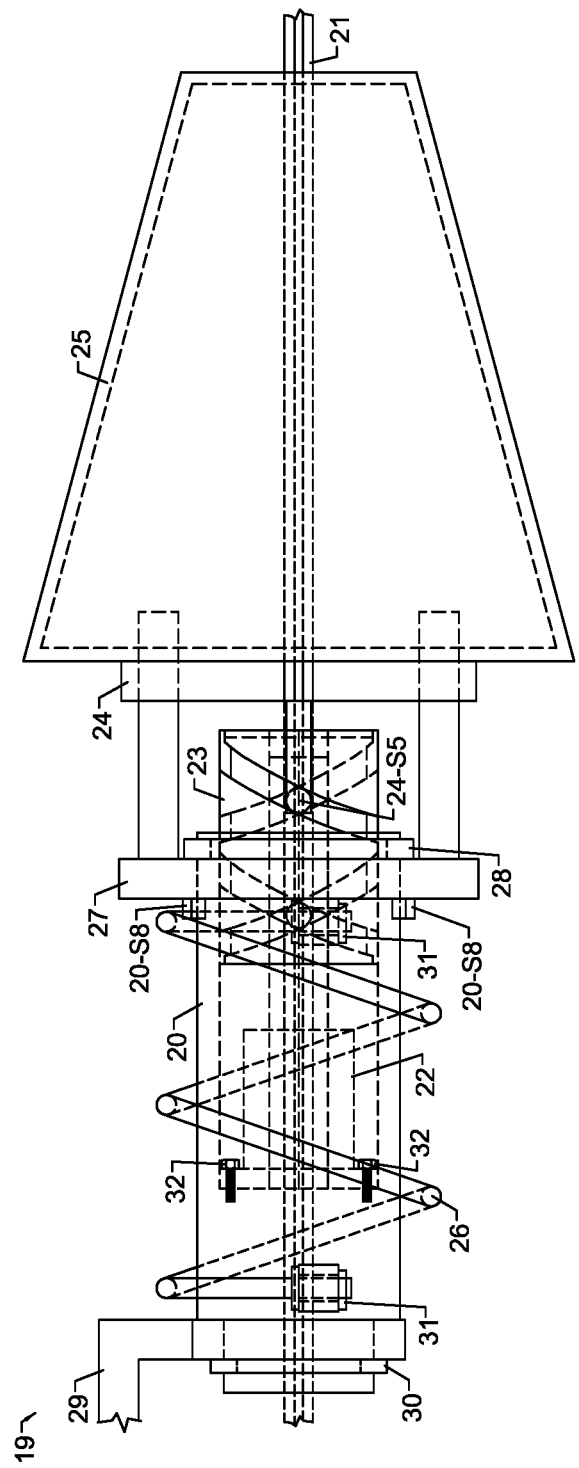
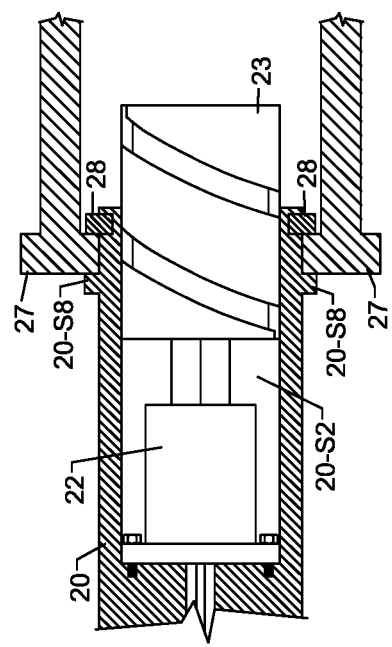
Fig. 32
Fig. 33

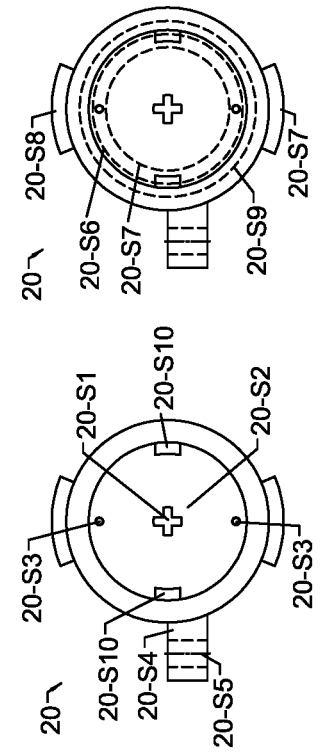
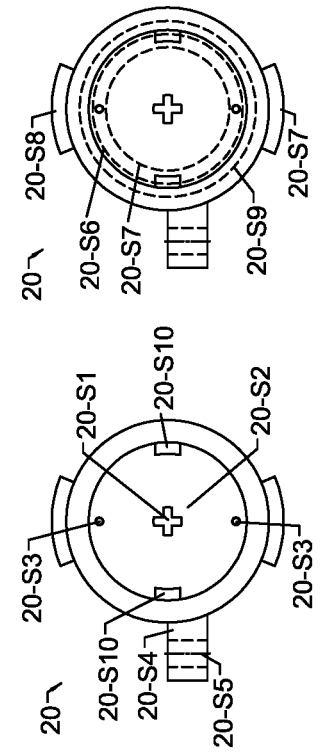
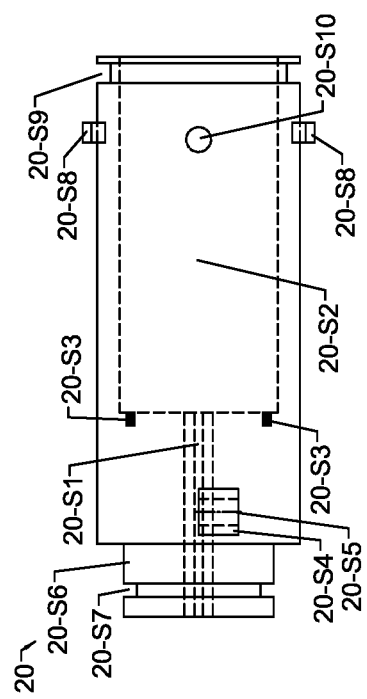
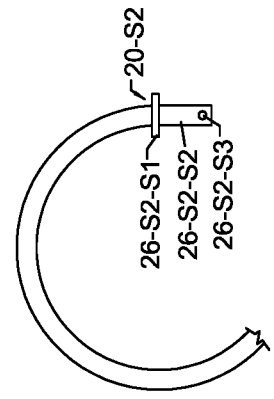
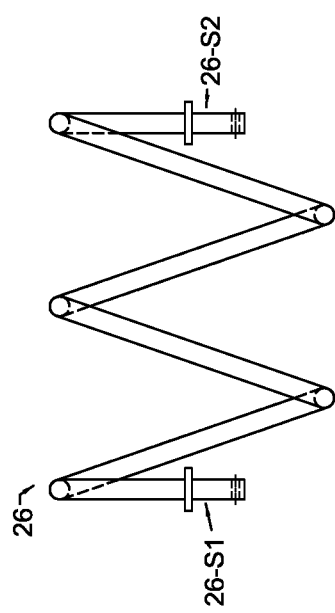
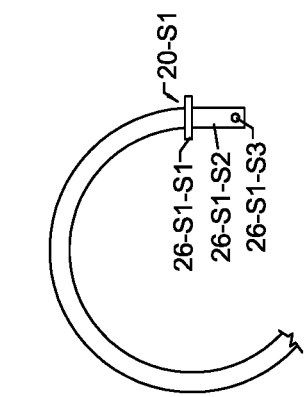

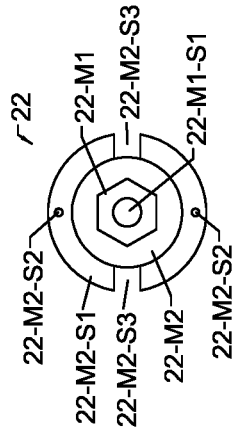
Fig. 41
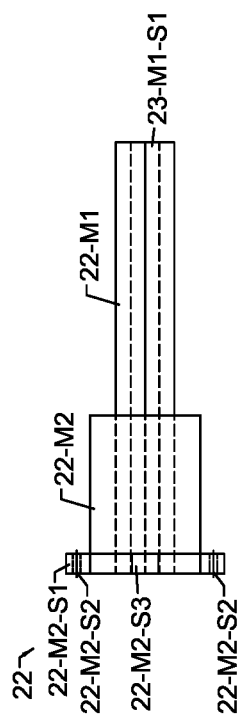
Fig. 40
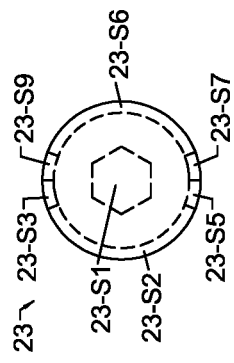
Fig. 43
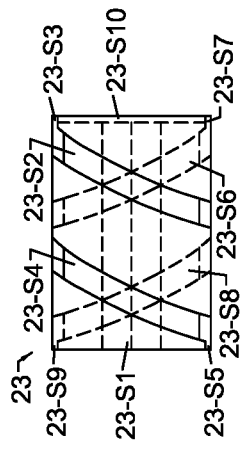
Fig. 42
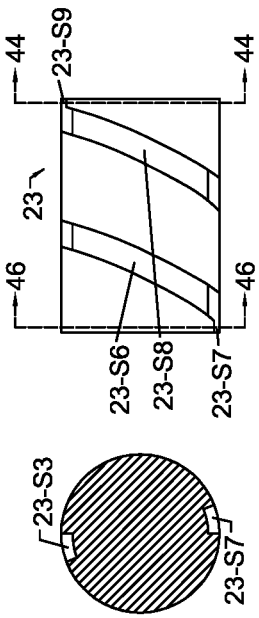
Fig. 47
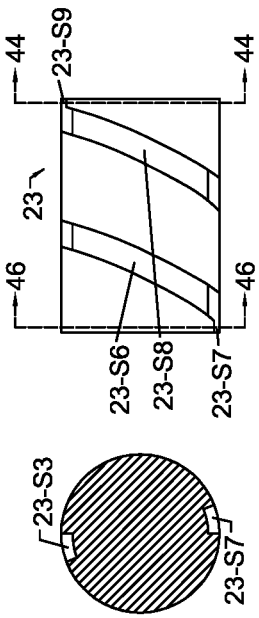
Fig. 46
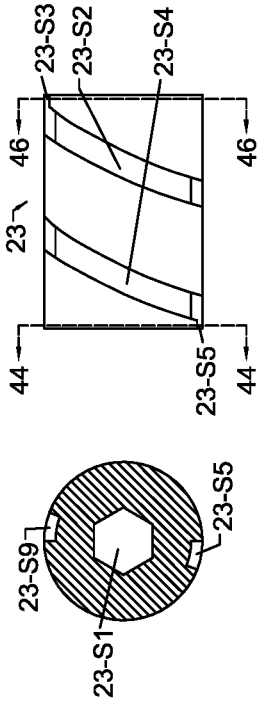
Fig. 45
Fig. 44

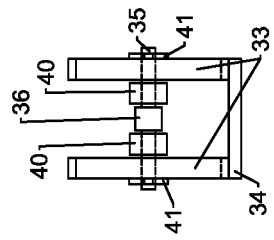
Fig. 59
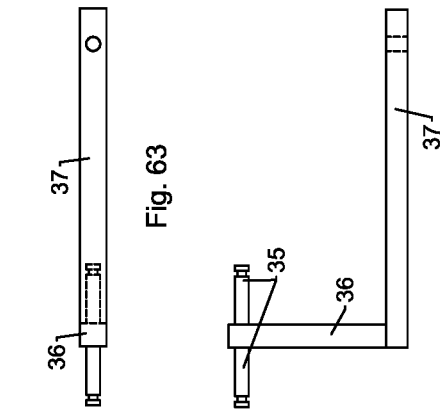
Fig. 63
Fig. 62
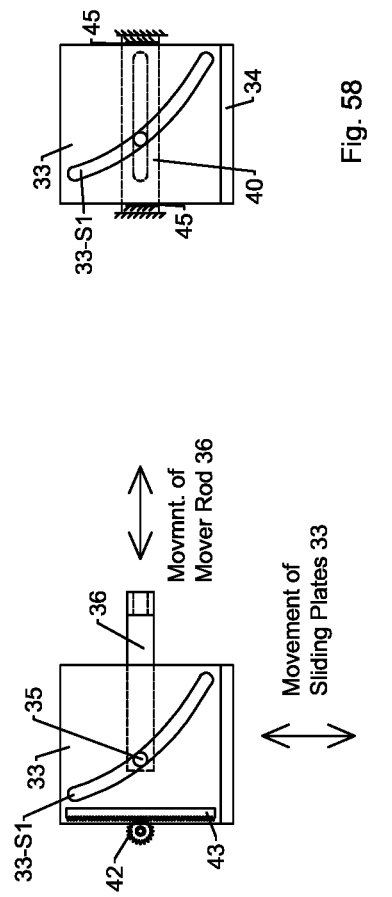
Fig. 58
Fig. 61
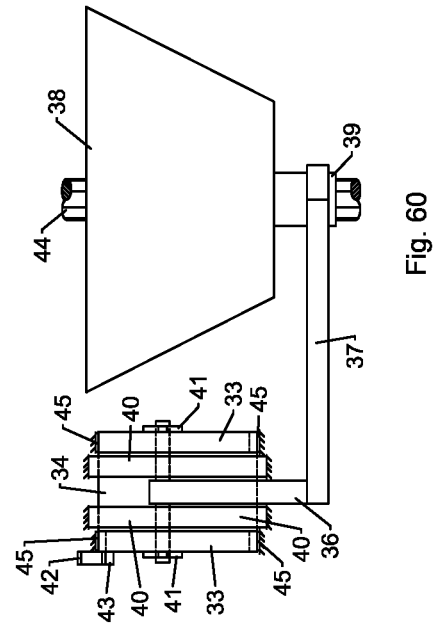
Fig. 57
Fig. 60

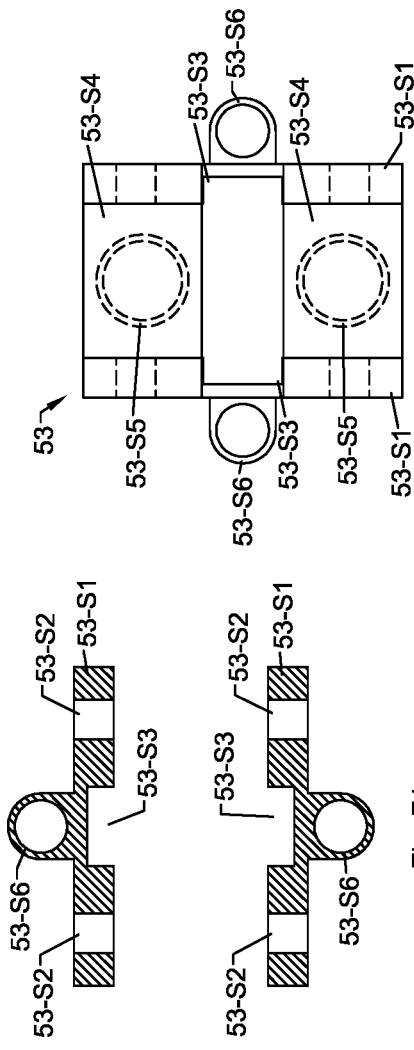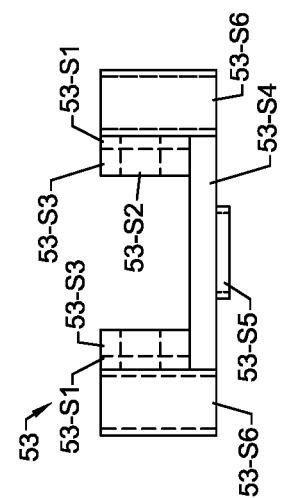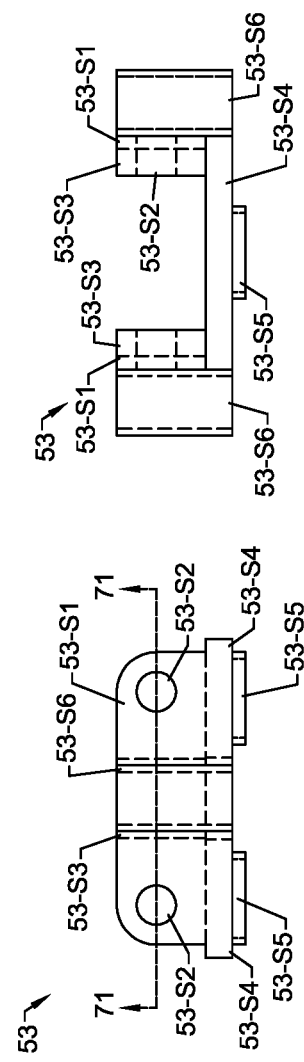

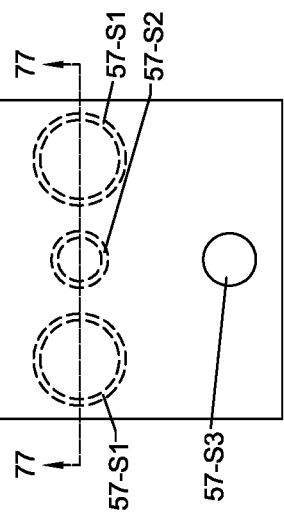
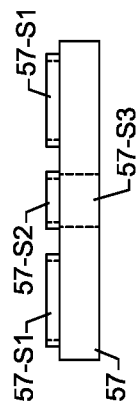
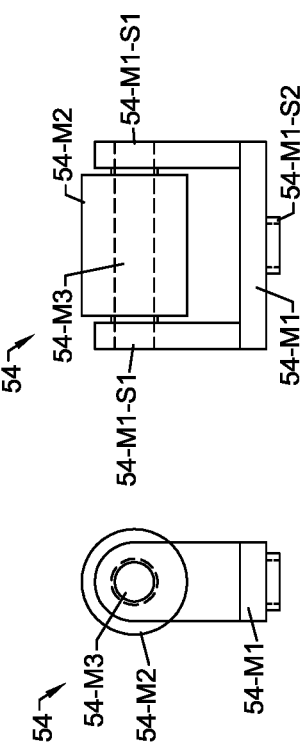
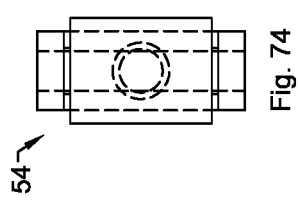
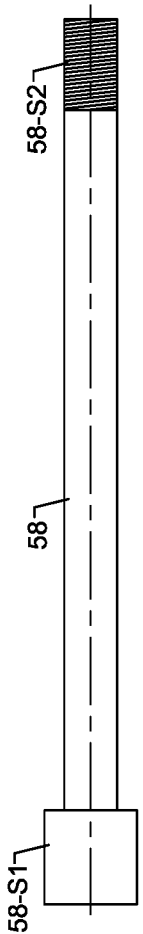

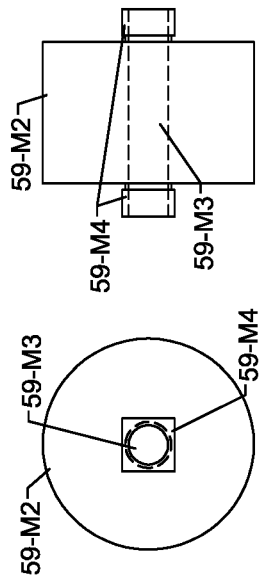
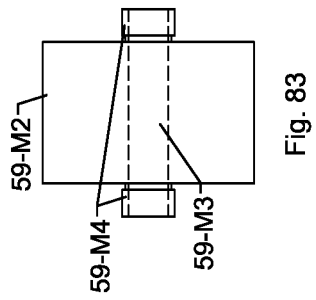
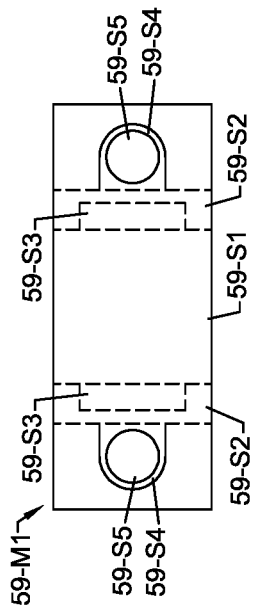
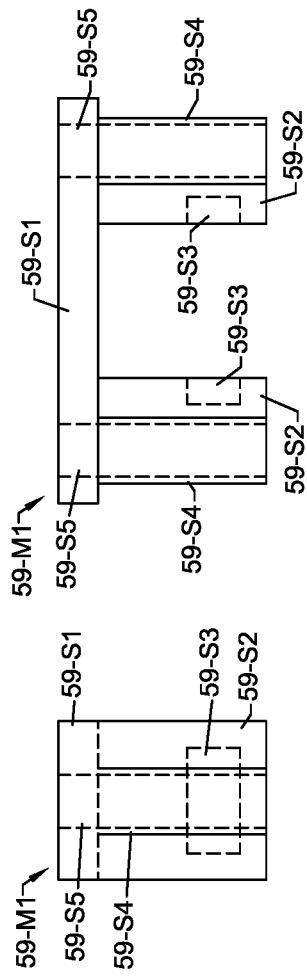
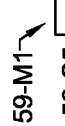

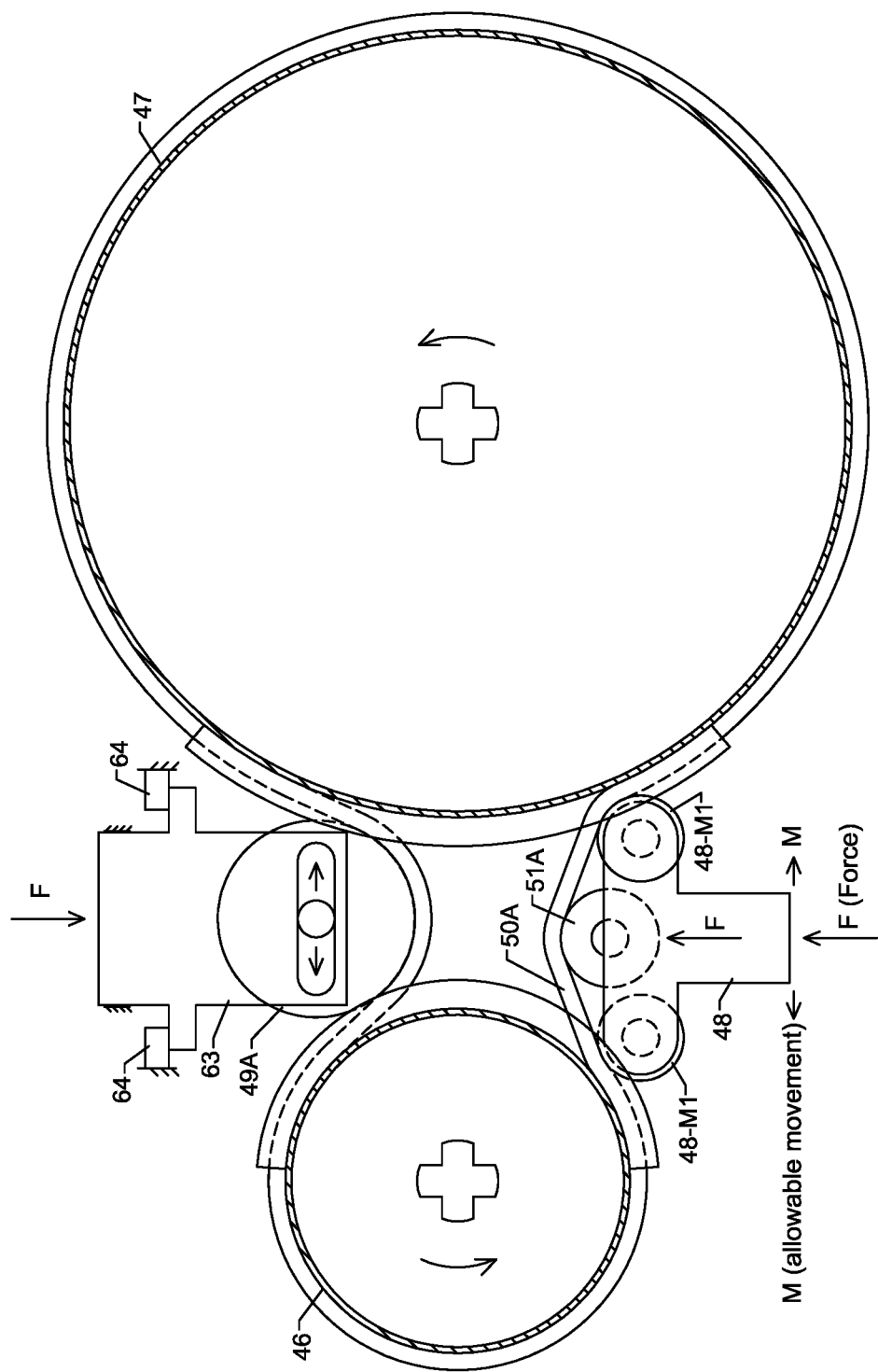

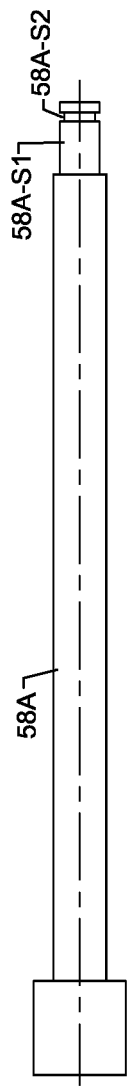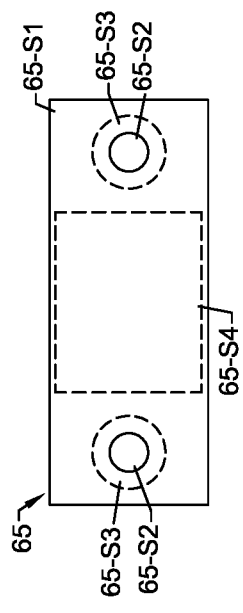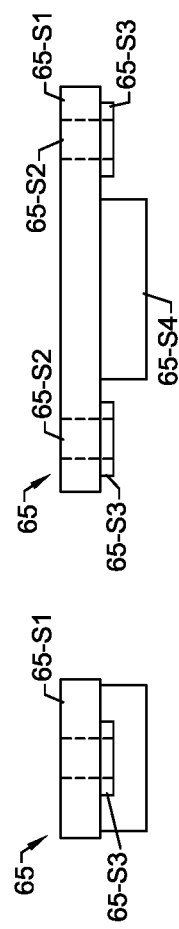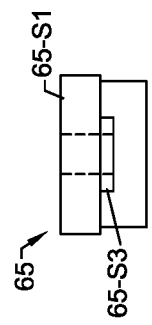

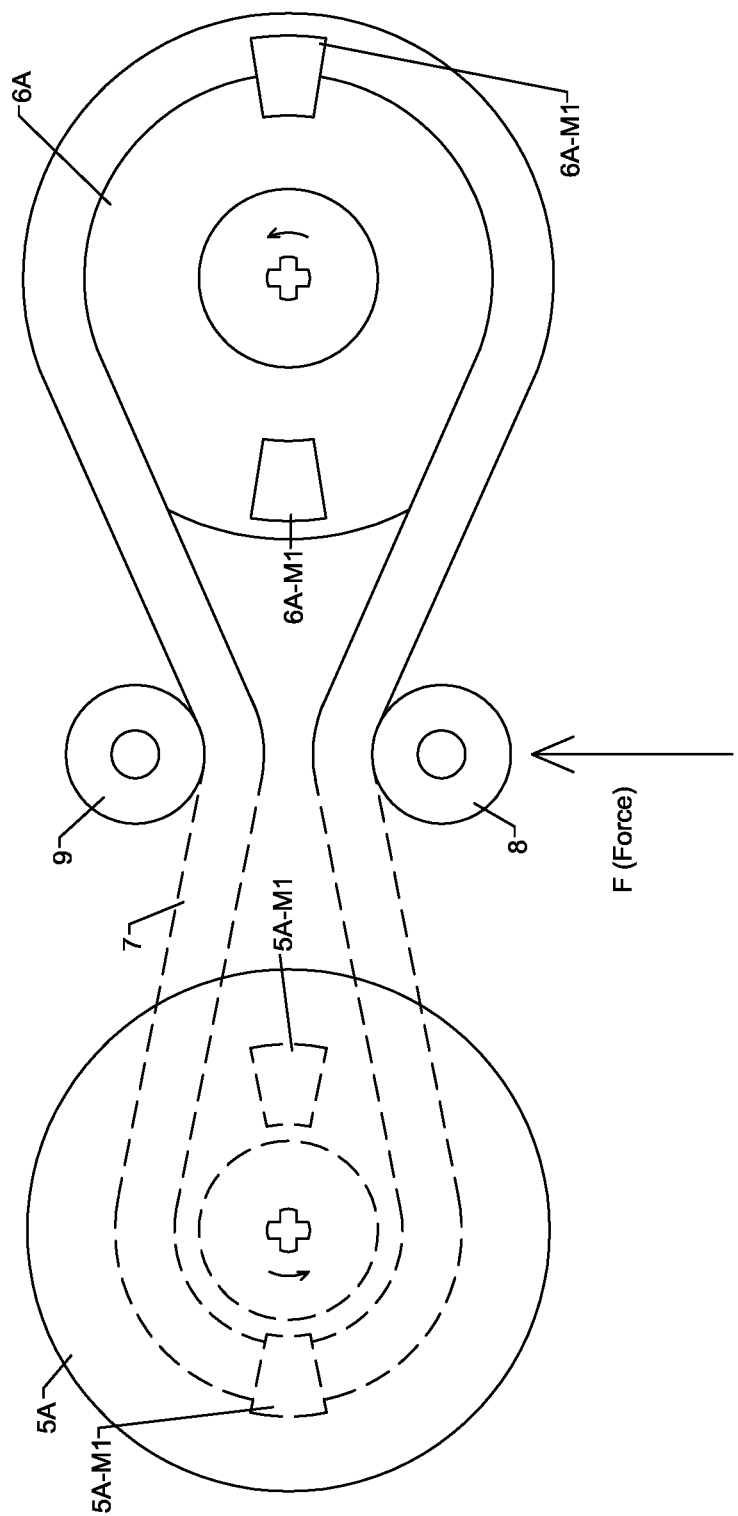

TOOTHED CVT FOR WHICH TEETH RE-ENGAGEMENT IS IMPROVED

CROSS-REFERENCE TO RELATED APPLICATIONS

This invention is entitled to the benefits of:
Provisional Patent Application Ser. 62/822,891 filed on 24 Mar. 2019
Provisional Patent Application Ser. 62/822,984 filed on 24 Mar. 2019
Provisional Patent Application Ser. 62/887,173 filed on 15 Aug. 2019
Provisional Patent Application Ser. 62/928,358 filed on 31 Oct. 2019
Provisional Patent Application Ser. 62/929,124 filed on 1 Nov. 2019
Provisional Patent Application Ser. 62/929,860 filed on 2 Nov. 2019
Provisional Patent Application Ser. 62/933,343 filed on 8 Nov. 2019
Provisional Patent Application Ser. 62/981,391 filed on 25 Feb. 2020

BACKGROUND

Field of Invention

This invention relates to torque/speed transmissions, specifically to a Continuously Variable Transmission (CVT) that uses a "Cone with One Torque Transmitting Member" that is coupled by a Transmission Belt to another "Cone with One Torque Transmitting Member" for which the re-engagement of the teeth of the Torque Transmitting Members with teeth of their Transmission Belt is improved.

Said CVT uses a slack-side Tensioning Pulley in order to maintain the tension in the slack-side of the Transmission Belt almost constant so as to ensure smooth re-engagement of the Driven Cone; and a Transmission Diameter Compensating Mechanism, which increases the Transmission Diameter of the Driving Cone when the torque being pulled by the Driving Cone is increased, in order to compensate for an increase in "Transmission Belt Teeth Compression" and an increase in "stretching of the tense side of the Transmission Belt", due to an increase in tension in the tense side of the Transmission Belt when an increased amount of torque is being transmitted by said CVT; to ensure smooth re-engagement of the Driving Cone.

Preferably said CVT also uses a "slack side Constrainer" that removes and/or provides "Transmission Belt slack" as needed when the axial position of the Cones are "aligned and "not aligned" for their current Transmission Ratio (see BRIEF SUMMARY OF THE INVENTION SECTION) without substantially changing the "angles at which the Transmission Belt approaches and leaves its Tensioning Pulley"; so as to reduce/minimize changes of the "angles at which the Transmission Belt approaches and leaves its Tensioning Pulley" due to whether the Cones are "aligned and "not aligned" for their current Transmission Ratio, and/or due to other operational variations of the CVT. This will reduce variation in the tension in the slack side of the Transmission Belt so as to further improve re-engagement of the Driven Cone. In addition, said "slack side Constrainer" also prevents teeth ratcheting at the point where engagement between the pulling Torque Transmitting Member and its Transmission Belt ends.

And preferably said CVT also uses a "Method of changing the Transmission Diameters of the Cones in increments specifically selected for each Transmission Diameter and Transmission Ratio" in order to compensate for: a) variation in "Transmission Belt Teeth Compression" at different Transmission Diameters; and b) variation in "slack side transmission belt tension" due to variation in the angle at which the Transmission Belt approaches and leaves its Tensioning Pulley based on whether the Cones are "aligned" or "not aligned" for their current Transmission Ratio.

BACKGROUND

Description of Prior Art

The inventions of this disclosure are primarily for a "cone with one torque transmitting member" described in U.S. Pat. No. 8,628,439.

A "cone with one torque transmitting member" of U.S. Pat. No. 8,628,439 (which is referred to as a front pin belt cone assembly 520A) is described in column 90 line 64 to column 99 line 11; and shown in FIGS. 91A, 91B, 92A, 92B, 93 to 101 of the Published Patent.

A "cone with one torque transmitting member" is basically a cone that has a "torque transmitting member" that is rotatably fixed relative to the surface of its cone, but can slide axially relative to the surface of its cone. The "torque transmitting member" is used for torque transmission and can be made toothed. Preferably (although not absolutely necessary), a "cone with one torque transmitting member" also has a "non-torque transmitting member", which is primarily used to maintain the alignment of the transmission belt of its cone and balance-out the centrifugal forces of the "torque transmitting member". For the cone with one torque transmitting member of U.S. Pat. No. 8,628,439, which is referenced in the previous paragraph, the a "torque transmitting member" is labeled as "pin belt torque transmitting member 590" and the "non-torque transmitting member" is labeled as "pin belt non-torque transmitting member 690".

An example of CVT that is constructed of out of two "cone with one torque transmitting member", which are labeled as Cone 1A and Cone 1B, is shown in FIGS. 1 to 4. This CVT comprises of Cone 1A mounted on one spline that is coupled by a Transmission Belt 2 (which can be replaced with a chain in an alternate configuration) to a Cone 1B mounted on another spline. A Tensioning Pulley 3, positioned on the slack side of Transmission Belt 2, is used to maintain proper tension in Transmission Belt 2 as the axial position of the cones are changed independent of each other. And a Support Pulley 4C is used to ensure that for each cone at least a portion of its torque transmitting member is engaged with Transmission Belt 2 for torque transmission at all times.

Cones 1A and 1B are each a "cone with one torque transmitting member". Cone 1A has a Torque Transmitting Member 1A-M1, Non-Torque Transmitting Member 1A-M2, and a Leveling Loop 1A-M3. Cone 1B has a Torque Transmitting Member 1B-M1, Non-torque Transmitting Member 1B-M2, and a Leveling Loop 1B-M3. Torque transmitting members 1A-M1 and 1B-M1 have teeth so that toothed torque transmission can be used, although friction torque transmitting members can also be used.

A leveling loop, such as Leveling Loop 1A-M3 and Leveling Loop 1B-M3, is a flexible loop with a tapered bottom surface that provides a level top resting surface for a transmission belt. It is recommended that each leveling loop is made out of a low friction flexible material that can expand and contract accordingly with the expansion and contraction of its cone; otherwise the CVT needs to be configured so that the leveling loops do not get in the way as the transmission ratio of their CVT is changed.

Tensioning Pulley 3 acts as a support pulley and tensioning pulley. Tensioning Pulley 3 and Support Pulley 4C are mounted so that they can freely move sideways in the horizontal direction. And Tensioning Pulley 3 is pushed upwards in the vertical direction so that it can maintain proper tension in Transmission Belt 2 for all operating conditions of the CVT.

Also, the "Mover Sliding Plate Mechanism" described in the "Mover Sliding Plate Mechanism for Converting Fixed Interval Movements to Required Interval Movement for Moving a Cone" has been previously disclosed in U.S. Pat. No. 9,958,064.

LISTING OF PRIOR ARTS

U.S. Pat. No. 7,713,153; Issue Date: 11 May 2010; Patentee: Naude.
U.S. Pat. No. 6,656,070; Issue Date: 2 Dec. 2003; Patentee: Tay.
U.S. Pat. No. 7,722,490; Issue Date: 25 May 2010; Patentee: Tay.
U.S. Pat. No. 8,628,439; Issue Date: 14 Jan. 2014; Patentee: Tay.
U.S. Pat. No. 9,651,123; Issue Date: 16 May 2017; Patentee: Tay.
U.S. Pat. No. 9,958,064; Issue Date: 1 May 2018; Patentee: Tay.
U.S. Pat. No. 9,964,209; Issue Date: 8 May 2018; Patentee: Tay.
European Patent EP2764279; Issue Date: 17 Jan. 2018; Patentee: Tay.
European Patent EP1311777; Issue Date: 6 Oct. 2010; Patentee: Tay.

BRIEF SUMMARY OF THE INVENTION

This disclosure describes a CVT that uses a "Cone with one Torque Transmitting Member" that is coupled by a Transmission Belt to another "Cone with one Torque Transmitting Member" for which teeth re-engagement of the "teeth of the Torque Transmitting Members" with the "teeth of their Transmission Belt" is improved.

For the CVT of prior art as described in the "BACKGROUND-DESCRIPTION OF PRIOR ART" section, when used for heavy load applications (obviously the CVT will also be used under no load situations, such as during start-up), smooth tooth re-engagement can be problem because of the large "Transmission Belt Teeth Compression" and "Transmission Belt Stretching" variation on the tense-side of the Transmission Belt. Regarding "Transmission Belt Teeth Compression", a heavy load will result in a large tension in the tense side of the Transmission Belt; and the large tension will push the teeth of said Transmission Belt towards its Cone at a force sufficient enough to cause significant compression of said teeth. Significant compression of said teeth will reduce the Transmission Diameter of the Transmission Belt, and this will cause the teeth of the Transmission Belt to slide circumferentially (away from their ideal engagement position) relative to the surface of their Cone; this is because the circumferential length of a portion of a Transmission Belt remains constant or almost constant regardless of its Transmission Diameter. The CVT's of this disclosure uses a Transmission Diameter Compensating Mechanism that can be used to address the "Transmission Belt Teeth Compression" and "Transmission Belt Stretching" problems in the tense-side of the Transmission Belt as discussed above.

In addition, for the CVT of prior art, when the axial positions of the Cones are changed independently as according to the method described in European Patent EP2764279; then slack needs to be provided or removed depending on whether the axial position of the Cones are "aligned" or "not aligned" for their current Transmission Ratio. And this can cause the tension in the slack side of the Transmission Belt to vary significantly between different Transmission Ratios; since the angles at which the Transmission Belt approaches and leaves its Tensioning Pulley can vary significantly between when slack needs to be provided and when slack needs to be removed.

The CVT's of this disclosure use a slack-side Tensioning Pulley in order to maintain the tension in the slack-side of the Transmission Belt almost constant so as to ensure smooth re-engagement of the Driven Cone; and a Transmission Diameter Compensating Mechanism, which increases the Transmission Diameter of the Driving Cone when the torque being pulled by the Driving Cone is increased, in order to compensate for an increase in "Transmission Belt Teeth Compression" and an increase in "stretching of the tense side Transmission Belt" due to an increase in tension in the tense side of the Transmission Belt when an increased amount of torque is being transmitted; to ensure smooth re-engagement of the Driving Cone.

The CVT's of this disclosure preferably also use a "Tensioning and Constraining Mechanism" that has a "slack side Constrainer" that removes or provides slack as needed when the axial position of the Cones are "aligned and "not aligned" for their current Transmission Ratio without substantially changing the "angles at which the Transmission Belt approaches and leaves its Tensioning Pulley"; so as to reduce/minimize changes of the "angles at which the Transmission Belt approaches and leaves its Tensioning Pulley" due different Transmission Ratios, and/or due to other operational variations of the CVT. Note, the Transmission Ratio depends on the axial position of the Cones, which can be "aligned" or "not aligned".

And in order to compensate for: a) variation in "Transmission Belt Teeth Compression" at different Transmission Diameters; and b) variation in "slack side transmission belt tension" due to variation in the angle the Transmission Belt approaches and leaves its Tensioning Pulley based on whether the Cones are "aligned" or "not aligned" for their current Transmission Ratio, the CVT's of this disclosure preferably also use a "Method of changing the Transmission Diameters of the Cones in increments specifically selected for each Transmission Diameter and Transmission Ratio".

BRIEF DESCRIPTION OF THE SEVERAL VIEWS OF THE DRAWING

In FIG. 1, the cones are cut (so as to remove the surfaces in front of said cut) at an axial-line selected so as to show the current torque transmitting member and non-torque transmitting member resting surfaces of the cones (refer to line A-A). In addition, all other surfaces of the cones, besides the current torque transmitting member and non-torque transmitting member resting surfaces of the cones, are not shown.

FIG. 5 shows a front-view of a CVT that is constructed of out of two "cone with one torque transmitting member", which uses a Tensioning Pulley 8 on the slack side of its Transmission Belt 7.

FIG. 6 shows a front-view of Transmission Diameter Compensating Mechanism 10 (Note: some hidden lines are not shown for clarity).

FIG. 7 shows a partial right-end-view of Transmission Diameter Compensating Mechanism 10.

FIG. 8 shows a front-view of Sleeve 11.

FIG. 9 shows a sectional-view of Sleeve 11.

FIG. 10 shows another sectional-view of Sleeve 11.

FIG. 11 shows another sectional-view of Sleeve 11.

FIG. 12 shows a front-view of Torsion Spring 13,

FIG. 13 shows a partial left-end-view of Torsion Spring 13.

FIG. 14 shows a partial right-end-view of Torsion Spring 13.

FIG. 15 shows a front-view of Nut Base 14.

FIG. 16 shows a right-end-view of Nut Base 14.

FIG. 17 shows a front-view of Nut 12.

FIG. 18 shows a right-end-view of Nut 12.

FIG. 19 shows a left-end-view of the Left-End Cover of Driving Cone 15.

FIG. 20 shows a front-view of Transmission Diameter Compensating Mechanism 10A (Note: some hidden lines are not shown for clarity).

FIG. 21 shows a front-view of Sleeve 11A,

FIG. 22 shows a partial right-end-view of Sleeve 11A.

FIG. 23 shows a front-view of Follower Mechanism Base 14A.

FIG. 24 shows a right-end-view of Follower Mechanism Base 14A.

FIG. 25 shows a left-end-view of Follower Mechanism 18.

FIG. 26 shows a front-view of Follower Mechanism 18.

FIG. 27 shows a left-end-view of Follower Frame 18-M1,

FIG. 28 shows a front-view of Follower Frame 18-M1.

FIG. 29 shows a left-end-view of Follower 18-M2.

FIG. 30 shows a front-view of Follower 18-M2.

FIG. 31 shows a left-end-view of Follower Mechanism 18A.

FIG. 32 shows a front-view of Transmission Diameter Compensating Mechanism 19.

FIG. 33 shows a front-view of Transmission Diameter Compensating Mechanism 19 for which the front-halves of Sleeve 20, Torsion Plate 27, and Locking Ring 28 have been removed by cutting them in half.

FIG. 34 shows a front-view of Sleeve 20.

FIG. 35 shows a right-end-view of Sleeve 20, for which some hidden-lines are not shown.

FIG. 36 shows a right-end-view of Sleeve 20.

FIG. 37 shows a front-view of Torsion Spring 26.

FIG. 38 shows a partial left-end-view of Torsion Spring 26

FIG. 39 shows a partial right-end-view of Torsion Spring 26.

FIG. 40 shows a front-view of Stepper Motor 22.

FIG. 41 shows a right-end-view of Stepper Motor 22.

FIG. 42 shows a front-view of Spiral 23.

FIG. 43 shows a right-end-view of Spiral 23

FIG. 44 shows a sectional-view of Spiral 23.

FIG. 45 shows a front-view of Spiral 23, for which the hidden-lines are not shown.

FIG. 46 shows another sectional-view of Spiral 23.

FIG. 47 shows a back-view of Spiral 23, for which the hidden-lines are not shown.

FIGS. 57 and 58 show a partial side-view of a "Mover Sliding Plate Mechanism".

FIG. 59 shows a partial end-view of a "Mover Sliding Plate Mechanism".

FIG. 60 shows a top-view of a "Mover Sliding Plate Mechanism",

FIG. 61 shows as a side-view of Mover Rod 36.

FIG. 62 shows as a top-view of Mover Rod 36.

FIG. 63 shows as a front-view of Mover Rod 36.

FIG. 68 shows a front-view of Constrainer 53.

FIG. 69 shows a side-view of Constrainer 53.

FIG. 70 shows a top-view of Constrainer 53.

FIG. 71 shows a sectional-view of Constrainer 53.

FIG. 72 shows a front-view of Tensioning Pulley Slider Mechanism 54.

FIG. 73 shows a side-view of Tensioning Pulley Slider Mechanism 54.

FIG. 74 shows a top-view of Tensioning Pulley Slider Mechanism 54.

FIG. 75 shows a front-view of Constrainer Push Plate 57.

FIG. 76 shows a top-view of Constrainer Push Plate 57.

FIG. 77 shows a sectional-view of Constrainer Push Plate 57.

FIG. 78 shows a front-view of a Connecting Rod 58.

FIG. 79 shows a front-view of a Frame 59-M1 of Constrainer Wheel Mounting Mechanism 45.

FIG. 80 shows a side-view of a Frame 59-M1 of Constrainer Wheel Mounting Mechanism 45.

FIG. 81 shows a top-view of a Frame 59-M1 of Constrainer Wheel Mounting Mechanism 45.

FIG. 82 shows a front-view of a Constrainer Wheel 59-M2, its Shaft 59-M3, and its Slider Blocks 45-M4.

FIG. 83 shows a side-view of a Constrainer Wheel 59-M2, its Shaft 59-M3, and its Slider Blocks 59-M4.

FIG. 86 shows a partial front-view of a "CVT 4 of a CVT 6" that uses the "Transmission Belt Constraining Method". Similar to FIGS. 1 and 3, in FIG. 86 the cones are cut (so as to remove the surfaces in front of said cut) at an axial-line selected so as to show the current torque transmitting member resting surfaces of the cones. In addition, all other surfaces of the cones, besides the current torque transmitting member resting surfaces of the cones, are not shown.

FIG. 89 shows a front-view of a Connecting Rod 58A.

FIG. 90 shows a front-view of Top Plate 65.

FIG. 91 shows a side-view of Top Plate 65.

FIG. 92 shows a top-view of Top Plate 65.

FIG. 93 shows a front-view of a CVT that is constructed of out of two "cone with two oppositely positioned torque transmitting members", which uses a Tensioning Pulley 8 on the slack side of its Transmission Belt 7.

REFERENCE NUMERALS IN DRAWINGS

Figure 2:
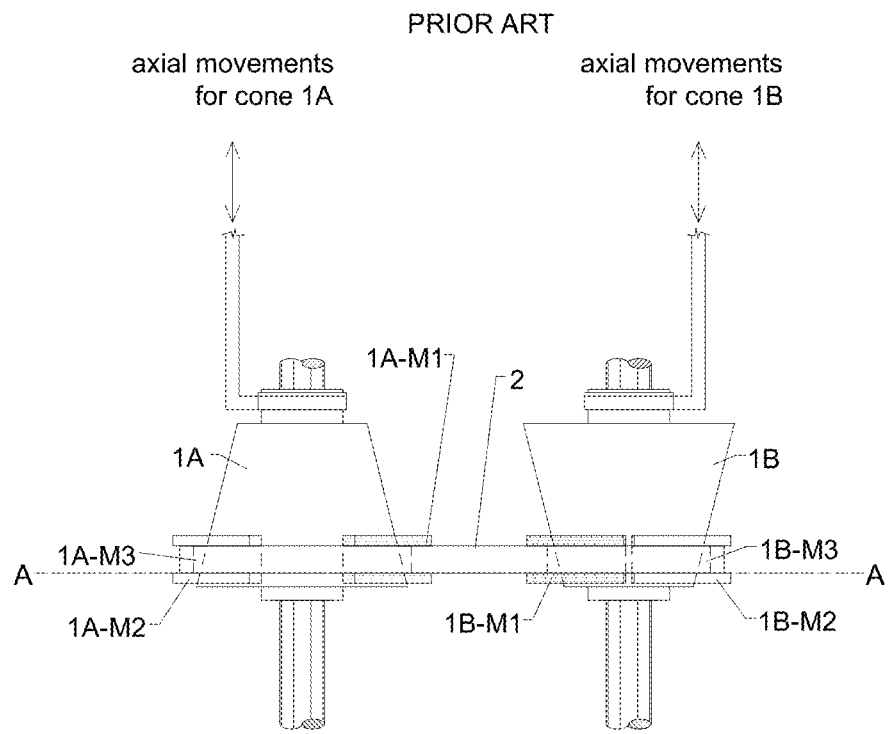
FIG. 2 shows a partial top-view of a CVT that is constructed of out of two "cone with one torque transmitting member"; note: some hidden lines are not shown.
Figure 1:
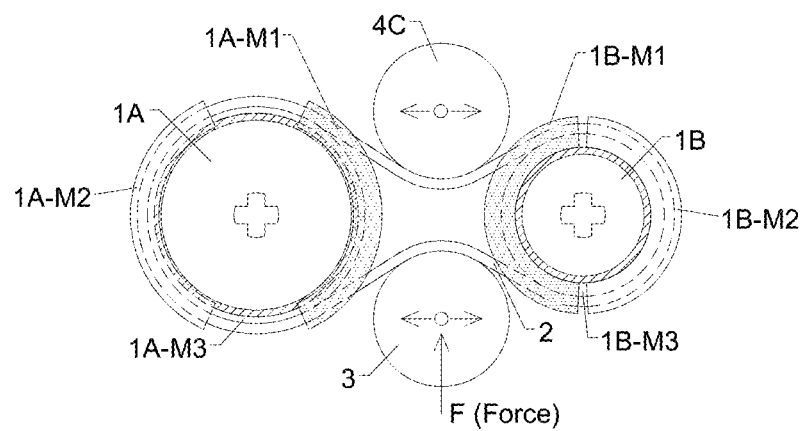
FIG. 1 shows a partial front-view of a CVT that is constructed of out of two "cone with one torque transmitting member".
Figure 4:
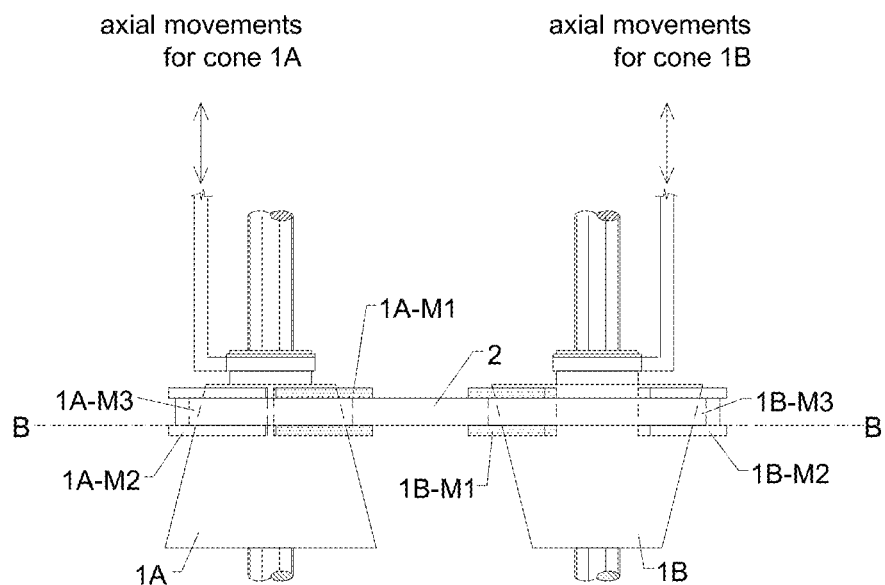
FIG. 4 shows another partial top-view of a CVT that is constructed of out of two "cone with one torque transmitting member"; note: some hidden lines are not shown.
Figure 3:
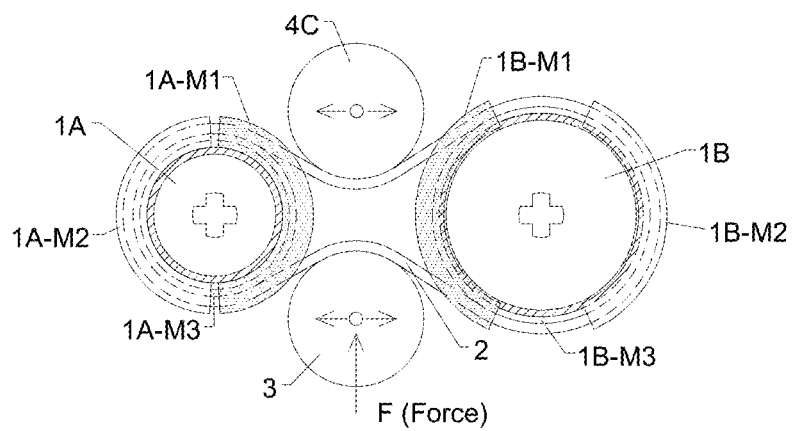
FIG. 3 shows another partial front-view of a CVT that is constructed of out of two "cone with one torque transmitting member", Like FIG. 1, in FIG. 3 the cones are cut (so as to remove the surfaces in front of said cut) at an axial-line selected so as to show the current torque transmitting member and non-torque transmitting member resting surfaces of the cones (refer to line B-B). In addition, all other surfaces of the cones, besides the current torque transmitting member and non-torque transmitting member resting surfaces of the cones, are not shown.

For the reference numerals in this disclosure, the label M(number) after a reference numeral, where (number) is a number, such as M2 for example, is used to label different members of a part that is given one reference numeral but consist of more than one member. And the label S(number) after a reference numeral, where (number) is a number, such as S2 for example, is used to label the different shapes of a part that is given one reference numeral. Furthermore, same parts that are used in different location might have a different labeling letter after their reference numeral, or a different reference numeral altogether if this is helpful in describing the invention. If two parts have the same reference numeral then they are identical unless otherwise described.

DETAILED DESCRIPTION OF THE INVENTION

CVT Configuration for Usage with a "Transmission Diameter Compensating Mechanism" and/or "Tensioning and Constraining Mechanism" (FIG. 5)

A CVT configuration that can be used with a "Transmission Diameter Compensating Mechanism" and/or "Tensioning and Constraining Mechanism" as described in this disclosure is shown in FIG. 5.

The CVT shown in FIG. 5 comprises of a Driving Cone 5 (which has a Torque Transmitting Member 5-M1) that is coupled by a Transmission Belt 7 to a Driven Cone 6C (which has a Torque Transmitting Member 6C-M1); in a manner so that the apex of Driving Cone 5 and the apex of Driven Cone 6C point in opposite directions (see configuration shown in FIG. 2). In addition, said CVT also has a Support Pulley 9 and Tensioning Pulley 8, which is positioned on the slack side of Transmission Belt 7 and pushed-up by a spring or other means. Note, when the Tensioning Pulley is placed on the slack side, its pre-tension should be lower than when it is placed on the tense side, since the purpose of the tensioner is to maintain adequate slack side tension.

It is desired to minimize the variation in the Transmission Diameter of a Cone due to variation in Transmission Belt tension, so that tooth misalignment during re-engagement of a Torque Transmitting Member due to variation in Transmission Belt tension can be eliminated/minimized.

For the CVT shown in FIG. 5, with sufficient pre-tension, the tension in the slack side of the transmission belt should be nearly constant regardless of the torque transmitted by the CVT; so that no Transmission Diameter Compensating Mechanism 10 or 10A is required for Driven Cone 6C, which engages on the slack side of the transmission belt.

For the CVT shown in FIG. 5, the tension in the tense side of the transmission belt depends of the torque transmitted by the CVT; so in order to minimize changes in the Transmission Diameter of the cone due to variation in tension in the tense side of the transmission belt, a Transmission Diameter Compensating Mechanism 10 or 10A is used for Driving Cone 5, which engages on the tense side of the transmission belt.

Transmission Diameter Compensating Mechanism (FIGS. 6 to 19)

A Transmission Diameter Compensating Mechanism 10 is a mechanism that pushes its Driving Cone 15 in the axial direction that will increase its Transmission Diameter when the torque being pulled by its Driving Cone 15 is increased; this is in order to compensate for an increase in "Transmission Belt Teeth Compression" and an increase in "stretching of the tense side Transmission Belt" due to an increase in tension in the tense side of its Transmission Belt.

Transmission Diameter Compensating Mechanism 10 is shown in FIGS. 6 and 7. Transmission Diameter Compensating Mechanism 10 comprises of a Sleeve 11 that slides on a Spline 17. Sleeve 11 has a Threaded Section 11-S7. On Threaded Section 11-S7, a Nut 12 is screwed on. One end of a Torsion Spring 13 is rotatably and axially fixed to Sleeve 11; while the other end of Torsion Spring 13 is rotatably fixed to a Nut Base 14. Nut Base 14 is shaped so it can transfer the rotation of Torsion Spring 13 to Nut 12, while allowing Nut 12 to freely move axially relative to Torsion Spring 13. Nut 12 is fixed to its Driving Cone 15, so that Driving Cone 15 is axially and rotatably constrained relative to Nut 12.

Spline 17 is pulling torque in the direction shown by Arrow 16, the direction of the pulling-resistance/reaction-force of Driving Cone 15 is shown by Arrow 16A. Here when the torque transmitted by Driving Cone 15 is increased (which increases the reaction-force of Driving Cone 15 applied to Nut 12), Torsion Spring 13 will deflect more so as to allow Nut 12 to rotate relative to Threaded Section 11-S7, which then (because of the threaded connection) will move Driving Cone 15 in the direction that will increase its Transmission Diameter.

Sleeve 11 is shown in FIGS. 8 to 11. In order to fix the bottom-end of a Torsion Spring 13 to Sleeve 11, as required per the previous paragraph, a Spring Connecting Plate 11-S4 is fixed to Sleeve 11 (see FIGS. 8 and 10). Spring Connecting Plate 11-S4 has a Hole 11-S5 into which the Insertion Rod of Mounting Shape 13-S1 of Torsion Spring 13 is inserted during assembly.

In order to prevent Nut 12 and Nut Base 14 from moving in the direction that will decrease the Transmission Diameter of Driving Cone 15 (which is to the left), two Stops 11-S6 are fixed to Sleeve 11. The engagement of Stops 11-S6 with Nut Base 14 will prevent Nut 12, Nut Base 14, and Driving Cone 15 from moving to the left in instances where the direction of the pulling torque is reversed.

In order to connect Sleeve 11 to the mechanism used to change the axial position of its Driving Cone 15, Sleeve 11 has a Flange 11-S3 and Locking Ring Groove 11-S2. Here a Bearing of a Connecting Rod of a Transmission Ratio Changing Mechanism can be inserted into Sleeve 11 and then axial secured through its engagement with Flange 11-S3 and the Locking Ring inserted into Locking Ring Groove 11-S2.

Torsion Spring 13 is shown in FIGS. 12 to 14. In order to attach the bottom-end of Torsion Spring 13 to Spring Connecting Plate 11-S4 of Sleeve 11, the bottom-end of Torsion Spring 13 has a Mounting Shape 13-S1. Mounting Shape 13-S1 has a Collar (which engages with a side surface of Spring Connecting Plate 11-S4), an Insertion Rod (which will be inserted into Hole 11-S5 of Spring Connecting Plate 11-S4), and a Locking Pin Hole (which will be used to secure the bottom-end of Torsion Spring 13 to Spring Connecting Plate 11-S4 through the use of a Locking Pin, which is not shown).

In order to attach the top-end of Torsion Spring 13 to Spring Connecting Plate 14-S2 of Nut Base 14, the top-end of Torsion Spring 13 has a Mounting Shape 13-S2. Mounting Shape 13-S2 has a Collar (which engages with the one side surface of Spring Connecting Plate 14-S2), an Insertion Rod (which will be inserted into Hole 14-S3 of Spring Connecting Plate 14-S2); and a Locking Pin Hole (which will be used to secure the bottom-end of Torsion Spring 13 to Spring Connecting Plate 14-S2 through the use of a Locking Pin, which is not shown).

Nut Base 14 is shown in FIGS. 15 and 16. It is shaped like a disc that has a Hole 14-S1, which is used to insert Nut Base 14 through the front-end of Slide 11. Hole 14-S1 has a diameter that is large enough relative to the diameter of Sleeve 11 so that it can freely slide relative to Sleeve 11.

In order to fix the top-end of a Torsion Spring 13 to Nut Base 14, a Spring Connecting Plate 14-S2 is fixed to Nut Base 14. Spring Connecting Plate 14-S2 has a Hole 14-S3 into which the Insertion Rod of Mounting Shape 13-S2 of Torsion Spring 13 is inserted during assembly.

In order to allow Nut Base 14 to transfer the rotation of Torsion Spring 13 to Nut 12, while allowing Nut 12 to freely move axially (to the left or to the right) relative to Torsion Spring 13 (as required by the first paragraph of this section); Nut Base 14 has two Rods 14-S4; which during assembly are inserted into Rod Holes 12-S2 of Nut 12, so as to allow Nut 12 to freely move axially relative to Nut Base 14. Here the engagement of Rods 14-S4 with Rod Holes 12-S2 will transfer the rotation of Nut Base 14 (which is fixed for rotation relative to Torsion Spring 13) to Nut 12.

Rods 14-S4 are long enough so that they extend beyond Nut 12 and also engage with Holes 15-S2 of the left-end cover of Driving Cone 15 (see FIG. 6; and FIG. 19; which shows a left-end-view of the Left-End Cover of Driving Cone 15); this will rotatably constrain Nut 12 relative to Driving Cone 15 (as required by the first paragraph of this section).

Driving Cone 15 should be allowed to freely slide relative to Spline 17 and Sleeve 11; for this purpose, the left-end cover of Driving Cone 15 has a Hole 15-S1 for Sleeve 11 (see FIG. 19), and the right-end cover of Driving Cone 15 has a Spline Cut-out 15-S3 for Spline 17 (see FIG. 7). Since Driving Cone 15 can slide freely relative to Sleeve 11, it is forced towards Nut 12 by the tension of its Transmission Belt, so as to axially constrain Driving Cone 15 relative to Nut 12 (as required by the first paragraph of this section). If desired, Driving Cone 15 can also be axially and rotatably constrained relative to Nut 12 through gluing, screwed connections, etc.

Nut 12 is shown in FIGS. 17 and 18. It is shaped like a round nut that has a centric Threaded Hole 12-S1 and two Rod Holes 12-S2. When Transmission Diameter Compensating Mechanism 10 is assembled (see FIG. 6), Threaded Hole 12-S1 is screwed on to Threaded Section 11-S7 of Sleeve 11. Here because of the threaded engagement, rotating Nut 12 counter-clockwise (which can be caused by the increased flexing of Torsion Spring 13 due to the increased torque applied on Driving Cone 15) will move Nut 12 to the right so as to increase the Transmission Diameter of Driving Cone 15.

Transmission Diameter Compensating Mechanism with Spiral

Transmission Diameter Compensating Mechanism 10A, shown in FIG. 20, is identical to Transmission Diameter Compensating Mechanism 10, except that the "Screw-and-Nut Mechanism" of Transmission Diameter Compensating Mechanism 10 is replaced with a "Spiral-and-Follower Mechanism". Because of this, the following parts of Transmission Diameter Compensating Mechanism 10 are replaced in Transmission Diameter Compensating Mechanism 10A: Sleeve 11 is replaced with Sleeve 11A, Nut Base 14 is replaced with Follower Mechanism Base 14A, and Nut 12 is replaced with Follower Mechanism 18.

Sleeve 11A is shown in FIGS. 21 and 22. It is identical to Sleeve 11; except that here, Threaded Section 11-S7 is replaced with a Spiral Groove 11A-S7. Spiral Groove 11A-S7 is formed in-between a Back Spiral Wall 11A-S8 and a Front Spiral Wall 11A-S9, which are parallel to each other (see FIG. 21).

Follower Mechanism Base 14A is shown in FIGS. 23 and 24. It is identical to Nut Base 14; except that for Follower Mechanism Base 14A, the two "Rods 14-S4 of Nut Base 14" are replaced with "Rods 14A-S4". Rods 14A-S4 are identical to Rods 14-S4 except for being longer. This is required in order to ensure that Rods 14A-S4 are always engaged with Holes 18-M1-S2 of Follower Mechanism 18 (see FIGS. 27 and 28), and are also always engaged with Holes 15-S2 of the left-end cover of Driving Cone 15 (see FIG. 19).

Follower Mechanism 18 is shown in FIGS. 25 to 30. Follower Mechanism 18 has the same function and operates identically as Nut 12; except that for Follower Mechanism 18, the threads of Nut 12 that engage with Threaded Section 11-S7 of Sleeve 11, are replaced with a Follower 18-M2 that engages with Spiral Groove 11A-S7 of Sleeve 11A.

Follower Mechanism 18 comprises of a Follower Frame 18-M1 (see FIGS. 27 and 28), a Follower 18-M2 (see FIGS. 29 and 30), and Locking Ring 18-M3 (see FIGS. 25 and 26). Follower 18-M2 is inserted into Hole 18-M1-S3 of Follower Frame 18-M1: in a manner so that it can rotate relative to Follower Frame 18-M1, but is constrained for any other movements relative to Follower Frame 18-M1. And Locking Ring 18-M3 is used to secure Follower 18-M2 to Follower Frame 18-M1.

Follower Frame 18-M1 is free to slide axially, but is rotationally constrained relative to Follower Mechanism Base 14A; and the engagement of Rods 14A-S4 of Follower Mechanism Base 14A with the Rod Holes 18-M1-S2 of Follower Frame 18-M1 will also ensure that Follower Frame 18-M1 is always parallel relative Follower Mechanism Base 14A. Because of this set-up, Follower Frame 18-M1 can be used to properly constrain the position of Follower 18-M2 relative Spiral Groove 11A-S7 in a manner so that the engagement of Follower 18-M2 with Spiral Groove 11A-S7 can be used to accurately control the axial position of Follower Frame 18-M1, and such also the axial position of Driving Cone 15.

Follower Frame 18-M1 is shown in FIGS. 27 and 28. It is shaped like a disc that has a centric Sleeve Hole 18-M1-S1, which allows Follower Frame 18-M1 to freely slide axially relative to Sleeve 11A; and two Rod Holes 18-M1-S2, into which Rods 14A-S4 of Follower Mechanism Base 14A are inserted in a manner so as to allow Rods 14A-S4 to slide axially relative to Rod Holes 18-M1-S2 while restricting any other relative movements between Rods 14A-S4 and Rod Holes 18-M1-S2.

And in order to attach Follower 18-M2 to Follower Frame 18-M1, Follower Frame 18-M1 has an Attachment Plate 18-M1-S3, which is a plate that has a hole into which the Shaft 18-M2-S1 of Follower 18-M2 is inserted. The fit between the hole of Attachment Plate 18-M1-S3 and Shaft 18-M2-S1 should be loose enough to allow Shaft 18-M2-S1 to freely rotate relative to Attachment Plate 18-M1-S3, but tight enough to restrict any radial movements between Shaft 18-M2-S1 and Attachment Plate 18-M1-S3.

Follower 18-M2 is shown in FIGS. 29 and 30. The main shape of Follower 18-M2 is Shaft 18-M2-S1. At the left-end of Shaft 18-M2-S1, two Back Engaging Surfaces 18-M2-S2 are shaped. Back Engaging Surfaces 18-M2-S2 can be shaped by separate shapes that are fixed to Shaft 18-M2-S1 (such as by gluing, bonding, etc.), or by machining the shapes onto Shaft 18-M2-S1. Back Engaging Surfaces 18-M2-S2 are the surfaces of Follower 18-M2 that engage with Back Spiral Wall 11A-S8 of Spiral Groove 11A-S7. Here in order to reduce the Hertzian Contact Stresses, Back Engaging Surfaces 18-M2-S2 should have a partial cylindrical contact surface, which has the largest diameter that allows for smooth engagement with Back Spiral Wall 11A-S8 of Spiral Groove 11A-S7. It is recommended that Back Engaging Surfaces 18-M2-S2 are shaped to the sides of the point of contact of Shaft 18-M2-S1 (see FIG. 30), so as to "not increase the diameter of said point of contact"; so that Shaft 18-M2-S1 can smoothly rotate as needed to have Back Engaging Surfaces 18-M2-S2 maintain normal engagement with Back Spiral Wall 11A-S8 as the shape of Back Spiral Wall 11A-S8 changes.

Shaft 18-M2-S1 does not have any "Hertzian Stress Reducing Engaging Surfaces" for its engagement with Front Spiral Wall 11A-S9. So that the cylindrical surface of Shaft 18-M2-S1 will engage directly with Front Spiral Wall 11A-S9. The forces on Front Spiral Wall 11A-S9 due to its engagement with Shaft 18-M2-S1 are only due to the force needed to change the axial position of its cone in the direction that that pulls its cone away from the axial compression applied on its cone by the tension of its transmission belt; these forces are lower than the force applied on Back Spiral Wall 11A-S8, which has to resist the axial compression applied on its cone by the tension of its transmission belt.

At the right-end of Shaft 18-M2-S1, a Locking Ring Groove 18-M2-S3 is shaped (see FIG. 29). During assembly, the right-end of Shaft 18-M2-S1 is inserted into the hole of Attachment Plate 18-M1-S3; and then Shaft 18-M2-S1 is secured to Attachment Plate 18-M1-S3 by inserting a Locking Ring 18-M3 into Locking Ring Groove 18-M2-S3.

An alternate to Follower Mechanism 18 is shown in FIG. 31, where it is labeled as Follower Mechanism 18A. It is identical to Follower Mechanism 18, except that its Follower Frame 18A-M1 has a Counterbalance 18A-M1-S4. Counterbalance 18A-M1-S4 is used to counterbalance the masses of Attachment Plate 18-M1-S3, Follower 18-M2, and the Locking Ring that is used to secure Follower 18-M2 to Attachment Plate 18-M1-S3.

If desired, Transmission Diameter Compensating Mechanisms 10 and 10A can be replaced with a sensor that monitors and an actuator that controls the actual Transmission Diameter of a Cone, Transmission Diameter Compensating Mechanism 76 can also be used with a Cone that engages on the slack side of its transmission belt; but here depending on the configuration of the CVT, the threads might be angled in the opposite direction. For example, for a CVT where the tensioning pulley is positioned on the tense side, then if used, the Transmission Diameter Compensating Mechanism 76 should move its cone that engages on the slack of its transmission belt in the direction that will decrease its Transmission Diameter as the torque is increased, since here an increase in torque will reduce slack side tension and as such compression.

Transmission Diameter Compensating Mechanism with Adjustable Spiral

Overview

A Transmission Diameter Compensating Mechanism 19, which can be used instead of Transmission Diameter Compensating Mechanism 10 is shown in FIG. 32. For Transmission Diameter Compensating Mechanism 19, the "Screw-and-Nut Mechanism" of Transmission Diameter Compensating Mechanism 10 is replaced with a "Spiral-and-Follower Mechanism".

Like Transmission Diameter Compensating Mechanism 10, Transmission Diameter Compensating Mechanism 19 should be used for a Driving Cone, and the spline of Transmission Diameter Compensating Mechanism 19 should pull torque in the same direction as the spline of Transmission Diameter Compensating Mechanism 10.

The "Spiral-and-Follower Mechanism" of Transmission Diameter Compensating Mechanism 19 can be used to provide more precise "Cone Diameter Increase Compensation"; since it allows for linear and non-linear compensation profiles, instead of just a linear compensation profile as can be provided by the "Screw-and-Nut Mechanism" of Transmission Diameter Compensating Mechanism 10.

Furthermore, the profile of the Spiral of the "Spiral-and-Follower Mechanism" of Transmission Diameter Compensating Mechanism 19 can be adjusted to an ideal profile for the "current Transmission Diameter of its Cone" by rotating said Spiral, preferably before the Transmission Diameter of its Cone is changed for a "CVT for which the tension in its Transmission Belt can be reduced before and during Transmission Diameter Changing".

Changing the profile of the Spiral can provide better "Cone Diameter Increase Compensation" because for a "Small Transmission Diameter" of a Cone, the compression force of its Transmission Belt is dispersed over a smaller surface area compared to a "Large Transmission Diameter" of said Cone; so that for a "Small Transmission Diameter" of a Cone more "Cone Diameter Increase Compensation" needs to be provided to compensate for the compression force of its Transmission Belt compared to a "Large Transmission Diameter" of said Cone.

And changing the profile of the Spiral can also adjust the "Cone Diameter Increase Compensation Provided" for compensating for stretching of its Transmission Belt. Here changing the profile of the Spiral can compensate for variation in stretching of its Transmission Belt at different Transmission Diameters due to length variation of said Transmission Belt at different Transmission Diameters.

Transmission Diameter Compensating Mechanism 19, shown in FIGS. 32 and 33, is basically identical to Transmission Diameter Compensating Mechanism 10, except that the "Screw-and-Nut Mechanism" of Transmission Diameter Compensating Mechanism 10 is replaced with an adjustable "Spiral-and-Follower Mechanism". This modification changes the parts of Transmission Diameter Compensating Mechanism 17 as described below.

Transmission Diameter Compensating Mechanism 19 has a Sleeve 20, which has a centric Spline Profile Hole 20-S1 (see FIGS. 34 and 35). A Spline 21 is inserted Into Spline Profile Hole 20-S1 in a manner so that Sleeve 20 cannot rotate relative to Spline 21, but can slide axially relative Spline 21.

Sleeve 20, which is shown in detail in FIGS. 34 to 36, is basically identical to Sleeve 11 of Transmission Diameter Compensating Mechanism 10, except that the Threaded Section 11-S7 of Sleeve 11 is replaced with a Cavity 20-S2 for mounting a Stepper Motor 22 to which a Spiral 23 is mounted (see FIGS. 33 and 34). Transmission Diameter Compensating Mechanism 19 is used for a Cone 25.

For Transmission Diameter Compensating Mechanism 19 the "rotational-deflection to axial movement conversion of Cone 25" is provided by the interaction between Spiral 23 and Followers 24-S5, which are fixed to a Follower Disk 24-S1 of a Follower Mechanism 24 (see FIGS. 32, and 51 to 53). During torque transmission operation; Spiral 23 is rotationally-fixed relative to Sleeve 20, while Follower Disk 24-S1, and as such Followers 24-S5, rotate with their Cone 25 relative to Sleeve 20 based on the amount of rotational deflection of a Torsion Spring 26 due to the torque transmitted by Cone 25.

Spiral 23 is shown in FIGS. 42 to 47; Drawings Set 1; FIG. 42 shows a front-view of Spiral 23 and FIG. 43 shows a right-end-view of Spiral 23; Drawings Set 2: FIG. 45 shows a front-view of Spiral 23 (which is the left-view of Spiral 23 when Spiral 23 is oriented as shown in FIG. 46), FIG. 47 shows a back-view of Spiral 23 (which is the right-view of Spiral 23 when Spiral 23 is oriented as shown in FIG. 46), and FIGS. 44 and 46 show sectional-views of Spiral 23. The hidden lines are not shown in FIGS. 44 to 47.

Spiral 23 is shaped like cylinder that has a Front Outer Spiral Groove 23-S2 and Front Inner Spiral Groove 23-S4 shaped on its front-cylindrical-half (see FIG. 45); and a Back Outer Spiral Groove 23-S6 and Back Inner Spiral Groove 23-S8 shaped on its back-cylindrical-half (see FIG. 47).

During assembly, Follower Mechanism 24 (see FIGS. 51 to 53) is threaded onto Spiral 23 by first inserting a Follower 24-S5 into each, Follower Insertion Slot 23-S3 and Follower Insertion Slot 23-S7 (see FIGS. 45 to 47); and then rotating Follower Mechanism 24 so as to guide one Follower 24-S5 to its final assembled position in Front Outer Spiral Groove 23-S2, and so as to also guide the other Follower 24-S5 to its final assembled position in Back Outer Spiral Groove 23-S6.

The profile of Front Outer Spiral Groove 23-S2 mirrors the profile of Back Outer Spiral Groove 23-S6 in a manner such that the rotation of Follower Mechanism 24 relative to Spiral 23 will cause "the axial movement applied to Follower Mechanism 24 due to the engagement of Front Outer Spiral Groove 23-S2 with its Follower 24-S5" to be the same as "the axial movement applied to Follower Mechanism 24 due to the engagement of Back Outer Spiral Groove 23-S6 with its Follower 24-S5"; so that Follower Mechanism 24 moves axially relative to Sleeve 20 in a manner so that Follower Disk 24-S1 is always parallel relative to the right-end surface of Sleeve 20.

In order to be able rotate Spiral 23 and control the axial position of Spiral 23, without having Front Outer Spiral Groove 23-S2 and Back Outer Spiral Groove 23-S6 apply any axial-forces on their Followers 24-S5, when their Followers 24-S5 are at their neutral position; Spiral 23 also has a Front Inner Spiral Groove 23-S4 (see FIG. 45) and Back Inner Spiral Groove 23-S8 (see FIG. 47).

During assembly, Spiral 23 is threaded onto Sleeve 20 by first inserting a Spiral Positioning Pin 20-S10 (see FIGS. 34 and 35) into each, Pin Insertion Slot 23-S5 and Pin Insertion Slot 23-S9 (see FIGS. 44, 45, and 47); and then rotating Spiral 23 so as to guide one Spiral Positioning Pin 20-S10 to its final assembled position in Front Inner Spiral Groove 23-S4, and so as to also guide the other Spiral Positioning Pin 20-S10 to its final assembled position in Back Inner Spiral Groove 23-S8.

The engagement of the Spiral Positioning Pins 20-S10 with their Inner Spiral Grooves (Front Inner Spiral Groove 23-S4 or Back Inner Spiral Groove 23-S8 respectively), is used to control the axial position of Spiral 23 relative to Sleeve 20.

Front Inner Spiral Groove 23-S4 is "parallel to" and has the same profile as Front Outer Spiral Groove 23-S2; and Back Inner Spiral Groove 23-S8 is "parallel to" and has the same profile as Back Outer Spiral Groove 23-S6; so that when Followers 24-S5 are at their neutral position, which is the position where they are horizontally aligned with Positioning Pins 20-S10, the axial distance between "the Spiral Positioning Pins 20-S10 positioned in the Inner Spiral Grooves (Front Inner Spiral Groove 23-S4 and Back Inner Spiral Groove 23-S8)" and "the Followers 24-S5 positioned in the Outer Spiral Grooves (Front Outer Spiral Groove 23-S2 and Back Outer Spiral Groove 23-S6)" remains constant regardless of the rotational position of Spiral 23; so that when Followers 24-S5 are at their neutral position, no axial force is applied to Followers 24-S5 due to the rotation of Spiral 23.

Preferably, the "Spiral Grooves Profiles" of Spiral 23 (which are Front Outer Spiral Groove 23-S2, Front Inner Spiral Groove 23-S4, Back Outer Spiral Groove 23-S6, and Back Inner Spiral Groove 23-S8) have a lead angle that is small enough so as to prevent any axial forces applied on them by Followers 24-S5 and by Spiral Positioning Pins 20-S10 from rotating their Spiral 23.

It is also recommended that Spiral 23 is at its most retracted position, which is a position where it cannot be rotated into its Sleeve 20 any further, when its CVT is shut-down. This is to prevent accidental/unintended rotation of Spiral 23 when its Stepper Motor 22 is turned-off, since Stepper Motor 22 has preferably some torque that prevents accidental/unintended rotation of Spiral 23 when it is turned-on.

If the Spirals 23 of a CVT are at their most retracted positions when their CVT are Shut-down, then the "Spiral Grooves Profiles" of the Cone(s) which is/are at its/their smallest Transmission Diameter when its/their CVT is/are Shut-down should differ from the "Spiral Grooves Profiles" of the Cone(s) which is/are at its/their largest Transmission Diameter when its/their CVT is/are Shut-down. The "Spiral Grooves Profiles" of a Spiral 23 can be obtained through experimentation or fundamental mathematics/engineering.

In order to rotate Spiral 23 with a hexagonal-shaped Shaft 22-M1 of Stepper Motor 22, Spiral 23 has a hexagonal Hole 23-S1 for Shaft 22-M1 (see FIGS. 42 and 43). The fit between Hole 23-S1 and Shaft 22-M1 is such that Spiral 23 can smoothly slide axially relative Shaft 22-M1, so as to allow Spiral 23 to move axially relative Sleeve 20; while minimizing relative rotational movement between Spiral 23 and Shaft 22-M1. And in order to limit how much Spiral 23 can retract into its Sleeve 20, Spiral 23 has a Cover 23-S10 at its front-end (see FIG. 42). The engagement of the rear surface of Cover 23-S10 with the front-end of Shaft 22-M1 will limit how much Spiral 23 can retract into its Sleeve 20.

The left-end of Torsion Spring 26 is fixed to Sleeve 20, while the right-end of Torsion Spring 26 is fixed to Torsion Plate 27. Torsion Plate 27 is mounted on Sleeve 20 so that it can rotate relative to Sleeve 20 but not move axially relative to Sleeve 20; a Sleeve Shoulder 20-S7 and a Locking Ring 28 are used to constrain the axial position of Torsion Plate 27 relative to Sleeve 20 (see FIGS. 32 and 33). And since Torsion Plate 27 is fixed to the right-end of Torsion Spring 26, its rotation relative to Sleeve 20 will cause Torsion Spring 26 to flex/deflect.

Torsion Plate 27 (which is shown by itself in FIGS. 48 to 50) has two Rods 27-S3, which engage with Rod Holes 24-S3 of Follower Mechanism 24 (see FIGS. 51 and 52) in a manner so as to transfer the rotation of Torsion Plate 27 to Follower Mechanism 24, while allowing Follower Mechanism 24 to move axially relative to Torsion Plate 27. And Cone 25 has a Rear Cover 25-S3 (see FIGS. 54 and 55) that has two Rod Holes 25-S4 that also engage with Rods 27-S3 of Torsion Plate 27 in a manner so as to transfer the rotation of Cone 25 to Torsion Plate 27, while allowing Cone 25 to move axially relative to Torsion Plate 27.

Through the arraignment of the previous paragraphs, the amount of torque transmitted by Cone 25 will determine the amount of rotation of Torsion Plate 27 relative to Sleeve 20 (and as such also Spiral 23) due to the deflection of Spring 26. And because of the rotational-to-axial movement conversion due to the engagement of "Followers 24-S5 of Follower Mechanism 24" with the "Outer Spiral Grooves of Spiral 23", the amount of rotation of Torsion Plate 27 relative to Spiral 23 will determine the amount of "Cone Diameter Increase Compensation" provided by Transmission Diameter Compensating Mechanism 19.

Details of Individual Parts—Sleeve 20

Sleeve 20 is shown in detail by itself in FIGS. 34 to 36; Sleeve 20 with its assembled parts is shown in FIGS. 32 and 33. Sleeve 20 has the following shapes: a) a Spline Profile Hole 20-S1 for a Spline 21, b) a centric Cavity 20-S2 for mounting Stepper Motor 22, c) Threaded Holes 20-S3 for fastening Stepper Motor 22 to Cavity 20-S2, d) a Spring Connecting Plate 20-S4 for rotate-ably fixing the left end of Torsion Spring 26 to Sleeve 20, e) a Connecting Rod Shaft 20-S6 for inserting the bearing of Connecting Rod 29, which is used to change the axial position of Cone 25, f) a Locking Ring Groove 20-S7 for a Locking Ring 30; which is used to axially constrain Connecting Rod 29 to Sleeve 20; e) two oppositely positioned Sleeve Shoulders 20-S8; f) a Locking Ring Groove 20-S9 for a Locking Ring 28, which with Sleeve Shoulders 20-S8 are used to axially constrain the axial position of Torsion Plate 27 relative to Sleeve 20 (see FIG. 33); and g) two oppositely positioned Spiral Positioning Pins 20-S10; which are fixed to Cavity 20-S2 as shown in FIGS. 34 to 36.

Spring Connecting Plate 20-S4 (see FIGS. 34 to 35) has a Hole 20-S5 for inserting a Mounting Rod 26-S1 of Torsion Spring 26 (see FIGS. 37 to 39). Hole 20-S5 has the same dimension as Hole 27-S5 of Spring Connecting Plate 27-S4 of Torsion Plate 27. Hole 27-S5, which is shown at its opening in FIG. 50; is used for inserting a Mounting Rod 26-S2, which has the same dimension as Mounting Rod 26-S1.

In order to allow for dimensional changes of Torsion Spring 26 due to flexing, Hole 20-S5 and Hole 27-S5 can be made slightly larger than the Mounting Rod inserted into each of them, which is either Mounting Rod 26-S1 or Mounting Rod 26-S2 respectively.

Details of Individual Parts—Torsion Spring 26

Torsion Spring 26 is shown in FIGS. 37 to 39. In order to attach the left-end of Torsion Spring 26 to Spring Connecting Plate 20-S4 of Sleeve 20, the left-end of Torsion Spring 26 has a Mounting Rod 26-S1. Mounting Rod 26-S1 has a Collar 26-S1-S1 (which engages with a side surface of Spring Connecting Plate 20-S4, see FIGS. 34, 38, and 32), an Insertion Rod 26-S1-S2 (which is inserted into Hole 20-S5 of Spring Connecting Plate 20-S4, see FIGS. 34, 38, and 32), and a Locking Pin Hole 26-S1-S3 (which is used to secure the left-end of Torsion Spring 26 to Spring Connecting Plate 20-S4 through the use of a Locking Pin 31, see FIGS. 34, 38, and 32).

In order to attach the right-end of Torsion Spring 26 to Spring Connecting Plate 27-S4 of Torsion Plate 27, the right-end of Torsion Spring 26 has a Mounting Rod 26-S2. Mounting Rod 26-S2 has a Collar 26-S2-S1 (which engages with a side surface of Spring Connecting Plate 27-S4, see FIGS. 39, 45, and 32), an Insertion Rod 26-S2-S2 (which will be inserted into Hole 27-S5 of Spring Connecting Plate 27-S4, see FIGS. 34, 45, and 32), and a Locking Pin Hole 26-S2-S3 (which will be used to secure the right-end of Torsion Spring 26 to Spring Connecting Plate 27-S4 through the use of another Locking Pin 31, see FIGS. 34, 45, and 32).

Details of Individual Parts—Stepper Motor 22

Stepper Motor 22 is shown in FIGS. 40 and 41. It has a hexagonal Shaft 22-M1 that extends-through all the way from its rear surface to its front surface. The hexagonal shape of Shaft 22-M1 fits into hexagonal Hole 23-S1 of Spiral 23, in manner such that the rotational position of Spiral 23 can be accurately controlled by Shaft 22-M1, while allowing Spiral 23 to slide axially relative to Shaft 22-M1.

Shaft 22-M1 has a centric Hole 22-M1-S1 that extends through the entire length of Shaft 22-M1. Through Hole 22-M1-S1, Spline 21 can be inserted in manner so that it can rotate relative to Hole 22-M1-S1 (see FIG. 32).

Stepper Motor 22 has a Motor 22-M2. In order to fix Motor 22-M2 to Cavity 20-S2 of Sleeve 20, Motor 22-M2 has a Flange 22-M2-S1, which has two Holes 22-M2-S2. Each Hole 22-M2-S2 is for the insertion of a Bolt 32, which is then threaded-on to a Threaded Hole 20-S3 of Sleeve 20 so as to secure Motor 22-M2 to Sleeve 20 (see FIGS. 34, 35, and 32). In addition, Flange 22-M2-S1 also has two Cuts 22-M2-S3, which allow Stepper Motor 22 to be inserted into Cavity 20-S2 without interfering with Spiral Positioning Pins 20-S10.

If desired Stepper Motor 22 can be replaced with other means for controllably rotating a shaft, such as servo motor for example.

Details of Individual Parts—Spiral 23

Spiral 23 is shown in FIGS. 42 to 47; Drawings Set 1: FIG. 42 shows a front-view of Spiral 23 and FIG. 43 shows a right-end-view of Spiral 23; Drawings Set 2: FIG. 45 shows a front-view of Spiral 23 (which is the left-view of Spiral 23 when Spiral 23 is oriented as shown in FIG. 46), FIG. 47 shows a back-view of Spiral 23 (which is the right-view of Spiral 23 when Spiral 23 is oriented as shown in FIG. 46), and FIGS. 44 and 46 show sectional-views of Spiral 23. The hidden lines are not shown in FIGS. 44 to 47.

Spiral 23 is shaped like cylinder that has a Front Outer Spiral Groove 23-S2 and Front Inner Spiral Groove 23-S4 shaped on its front-cylindrical-half (see FIG. 45); and a Back Outer Spiral Groove 23-S6 and Back Inner Spiral Groove 23-S8 shaped on its back-cylindrical-half (see FIG. 47).

During assembly, Follower Mechanism 24 (see FIGS. 51 to 53) is threaded onto Spiral 23 by first inserting a Follower 24-S5 into each, Follower Insertion Slot 23-S3 and Follower Insertion Slot 23-S7 (see FIGS. 45 to 47); and then rotating Follower Mechanism 24 so as to guide one Follower 24-S5 to its final assembled position in Front Outer Spiral Groove 23-S2, and so as to also guide the other Follower 24-S5 to its final assembled position in Back Outer Spiral Groove 23-S6.

The profile of Front Outer Spiral Groove 23-S2 mirrors the profile of Back Outer Spiral Groove 23-S6 in a manner such that the rotation of Follower Mechanism 24 relative to Spiral 23 will cause "the axial movement applied to Follower Mechanism 24 due to the engagement of Front Outer Spiral Groove 23-S2 with its Follower 24-S5" to be the same as "the axial movement applied to Follower Mechanism 24 due to the engagement of Back Outer Spiral Groove 23-S6 with its Follower 24-S5"; so that Follower Mechanism 24 moves axially relative to Sleeve 20 in a manner so that Follower Disk 24-S1 is always parallel relative to the right-end surface of Sleeve 20.

In order to be able rotate Spiral 23 and control the axial position of Spiral 23, without having Front Outer Spiral Groove 23-S2 and Back Outer Spiral Groove 23-S6 apply any axial-forces on their Followers 24-S5, when their Followers 24-S5 are at their neutral position; Spiral 23 also has a Front Inner Spiral Groove 23-S4 (see FIG. 45) and Back Inner Spiral Groove 23-S8 (see FIG. 47).

During assembly, Spiral 23 is threaded onto Sleeve 20 by first inserting a Spiral Positioning Pin 20-S10 (see FIGS. 34 and 35) into each, Pin Insertion Slot 23-S5 and Pin Insertion Slot 23-S9 (see FIGS. 44, 45, and 47); and then rotating Spiral 23 so as to guide one Spiral Positioning Pin 20-S10 to its final assembled position in Front Inner Spiral Groove 23-S4, and so as to also guide the other Spiral Positioning Pin 20-S10 to its final assembled position in Back Inner Spiral Groove 23-S8.

The engagement of the Spiral Positioning Pins 20-S10 with their Inner Spiral Grooves (Front Inner Spiral Groove 23-S4 or Back Inner Spiral Groove 23-S8 respectively), is used to control the axial position of Spiral 23 relative to Sleeve 20.

Front Inner Spiral Groove 23-S4 is "parallel to" and has the same profile as Front Outer Spiral Groove 23-S2; and Back Inner Spiral Groove 23-S8 is "parallel to" and has the same profile as Back Outer Spiral Groove 23-S6; so that when Followers 24-S5 are at their neutral position, which is the position where they are horizontally aligned with Positioning Pins 20-S10, the axial distance between "the Spiral Positioning Pins 20-S10 positioned in the Inner Spiral Grooves (Front Inner Spiral Groove 23-S4 and Back Inner Spiral Groove 23-S8)" and "the Followers 24-S5 positioned in the Outer Spiral Grooves (Front Outer Spiral Groove 23-S2 and Back Outer Spiral Groove 23-S6)" remains constant regardless of the rotational position of Spiral 23; so that when Followers 24-S5 are at their neutral position, no axial force is applied to Followers 24-S5 due to the rotation of Spiral 23.

Preferably, the "Spiral Grooves Profiles" of Spiral 23 (which are Front Outer Spiral Groove 23-S2, Front Inner Spiral Groove 23-S4, Back Outer Spiral Groove 23-S6, and Back Inner Spiral Groove 23-S8) have a lead angle that is small enough so as to prevent any axial forces applied on them by Followers 24-S5 and by Spiral Positioning Pins 20-S10 from rotating their Spiral 23.

It is also recommended that Spiral 23 is at its most retracted position, which is a position where it cannot be rotated into its Sleeve 20 any further, when its CVT is shut-down. This is to prevent accidental/unintended rotation of Spiral 23 when its Stepper Motor 22 is turned-off, since Stepper Motor 22 has preferably some torque that prevents accidental/unintended rotation of Spiral 23 when it is turned-on.

If the Spirals 23 of a CVT are at their most retracted positions when their CVT are Shut-down, then the "Spiral Grooves Profiles" of the Cone(s) which is/are at its/their smallest Transmission Diameter when its/their CVT is/are Shut-down should differ from the "Spiral Grooves Profiles" of the Cone(s) which is/are at its/their largest Transmission Diameter when its/their CVT is/are Shut-down. The "Spiral Grooves Profiles" of a Spiral 23 can be obtained through experimentation or fundamental mathematics/engineering.

In order to rotate Spiral 23 with hexagonal-shaped Shaft 22-M1 of Stepper Motor 22, Spiral 23 has a hexagonal Hole 23-S1 for Shaft 22-M1 (see FIGS. 42 and 43). The fit between Hole 23-S1 and Shaft 22-M1 is such that Spiral 23 can smoothly slide axially relative Shaft 22-M1, so as to allow Spiral 23 to move axially relative Sleeve 20; while minimizing relative rotational movement between Spiral 23 and Shaft 22-M1. And in order to limit how much Spiral 23 can retract into its Sleeve 20, Spiral 23 has a Cover 23-S10 at its front-end (see FIG. 42). The engagement of the rear surface of Cover 23-S10 with the front-end of Shaft 22-M1 will limit how much Spiral 23 can retract into its Sleeve 20.

It is recommended that Spiral 23 is rotated when Torsion Plate 27 and Cone 25 are in their un-deflected rotational position relative to their Sleeve 20. Torsion Plate 27 and Cone 25 are in their un-deflected rotational position relative their Sleeve 20 when no torque or an insignificant amount of torque is transmitted by Cone 25. As such, it is recommended that Spiral 23 of a Cone 25 is rotated when its said Cone 25 is currently not used for torque transmission. Since when torque is transmitted by its Cone 25, a significant torque is required in order to rotate Spiral 23; because here Followers 24-S5 are rotationally deflected relative to Spiral Positioning Pins 20-S10 (Followers 24-S5 and Spiral Positioning Pins 20-S10 are not horizontally aligned), so that the "guided axial movement of Spiral 23 due to the engagement of the 'rotating inner grooves (Front Inner Spiral Groove 23-S4 and Back Inner Spiral Groove 23-S8)' with Spiral Positioning Pins 20-S10" will not match the "axial movement of Spiral 23 needed so that no axial forces are applied to its 'rotationally deflected Followers 24-S5' by its 'rotating outer grooves (Front Outer Spiral Groove 23-S2 and Back Outer Spiral Groove 23-S6)".'

It is also recommended that Spiral 23 is rotated to its "new ideal rotational position per the Transmission Diameter of its cone" immediately prior to the Transmission Diameter change of its cone, so the Spiral 23 is only not in its "ideal rotational position per the Transmission Diameter of its cone" immediately prior to the Transmission Diameter change of its cone.

Details of Individual Parts—Torsion Plate 27

Figure 49:
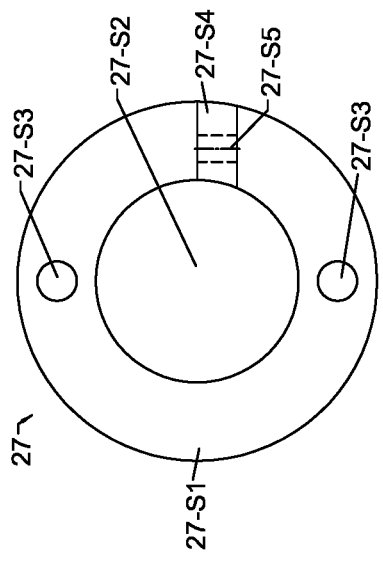
FIG. 49 shows a right-end-view of Torsion Plate 27.
Figure 50:
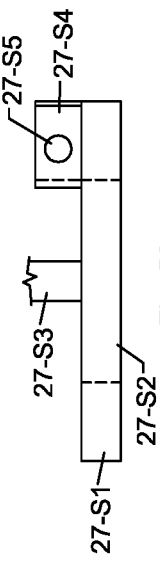
FIG. 50 shows a partial-front-view of Torsion Plate 27 when Torsion Plate 27 is oriented as shown in FIG. 49.
Figure 48:
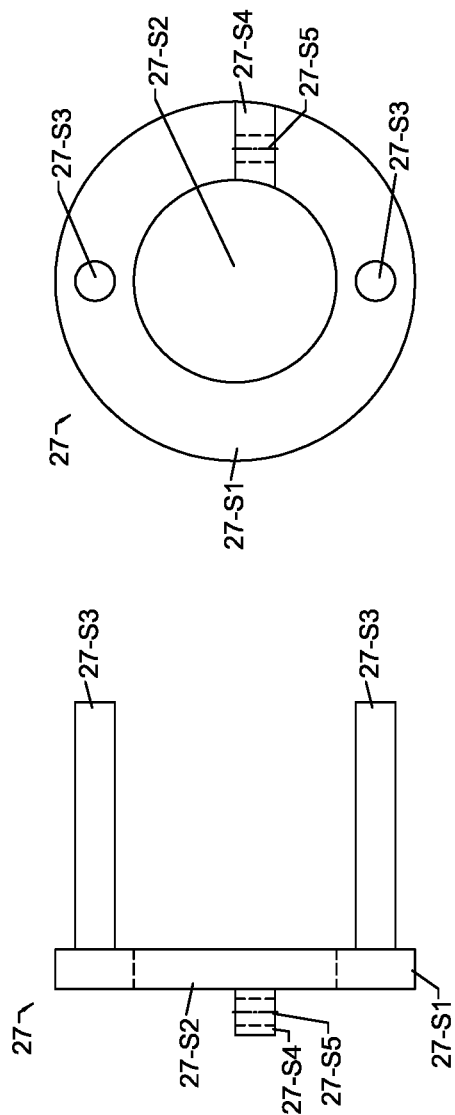
FIG. 48 shows a front-view of Torsion Plate 27.

Torsion Plate 27 is shown in FIGS. 48 to 50. FIG. 48 shows a front-view of Torsion Plate 27, FIG. 49 shows a right-end-view of Torsion Plate 27, and FIG. 50 shows a partial-front-view of Torsion Plate 27 when Torsion Plate 27 is oriented as shown in FIG. 49.

Torsion Plate 27 has the shape of a "disk with a large hole" to which two rods and a spring connecting plate are fixed. Said disk is labeled as Disk 27-S1, said large hole is labeled as Hole 27-S2, said rods are labeled as Rods 27-S3, and said spring connecting plate is labeled as Spring Connecting Plate 27-S4.

The dimension of Hole 27-S2 is such that Torsion Plate 27 can smoothly and securely rotate on Sleeve 20 (see FIGS. 32 and 33).

Figure 54:
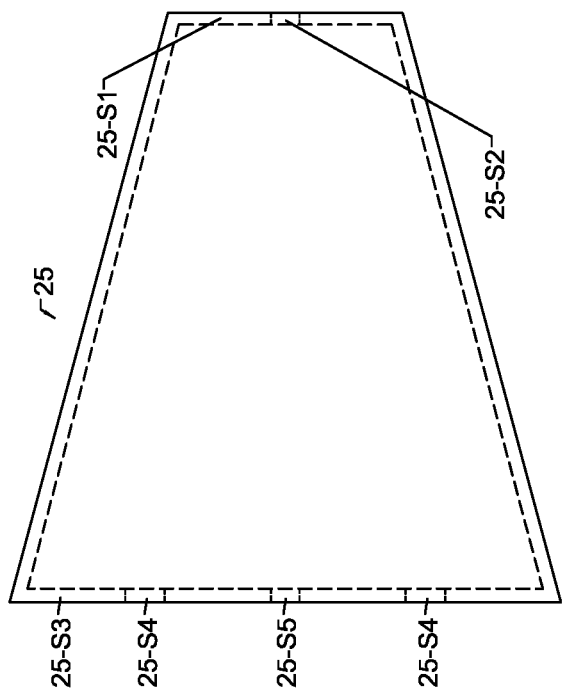
FIG. 54 shows a front-view of Cone 25.
Figure 55:
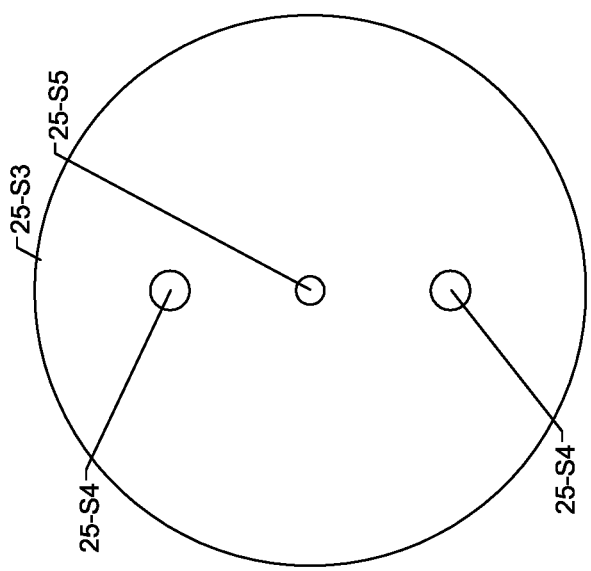
FIG. 55 shows a left-end-view of Cone 25, for which the hidden-lines are not shown.

The dimension of Rods 27-S3 are such that they can be smoothly and securely inserted into Rod Holes 24-S3 of Follower Mechanism 24 (see FIGS. 51, 52, and 32) and into Rod Holes 25-S4 of Cone 25 (see FIGS. 54, 55, and 32). Rods 27-S3 also have sufficient length to stay engaged with Rod Holes 24-S3 and Rod Holes 25-S4 for all operating condition of their CVT. The engagement of Rods 27-S3 with Rod Holes 24-S3 and Rod Holes 25-S4 is used to constrain the rotational position of Follower Mechanism 24 and the rotational position of Cone 25 relative to Torsion Plate 27, while allowing Follower Mechanism 24 and Cone 25 to move axially relative to Torsion Plate 27.

Spring Connecting Plate 27-S4 has a Hole 27-S5 into which Mounting Rod 26-S2 of Spring 26 can be inserted and then secured using Locking Pin 31 (see FIGS. 48 to 50, 37, 39, and 32).

During assembly, the left-end of Spring 26 should be secured first by securing Mounting Rod 26-S1 to Spring Connecting Plate 20-S4 of Sleeve 20. Then Rods 27-S3 of Torsion Plate 27 (which is already at its final assembled position on Sleeve 20) should be inserted into Rod Holes 24-S3 of Follower Mechanism 24 (which is yet to be assembled to Sleeve 20). Then while Follower Mechanism 24 is threaded onto Spiral 23 (which is also already at its final assembled position in Sleeve 20), Spring Connecting Plate 27-S4 of Torsion Plate 27 will be rotated counter-clockwise towards Mounting Rod 26-S2 of Spring 26; and when Follower Mechanism 24 has reached its final assembled position, Spring Connecting Plate 27-S4 should be in a position where it can be fixed to Mounting Rod 26-S2 through the use of a Locking Pin 31 (see FIG. 32), so as to fix the right-end of Spring 26 to Spring Connecting Plate 27-S4.

Details of Individual Parts—Follower Mechanism 24

Figure 51:
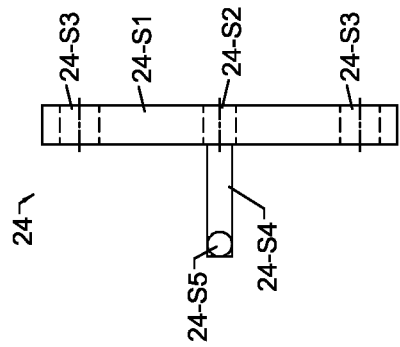
FIG. 51 shows a front-view of Follower Mechanism 24.
Figure 52:
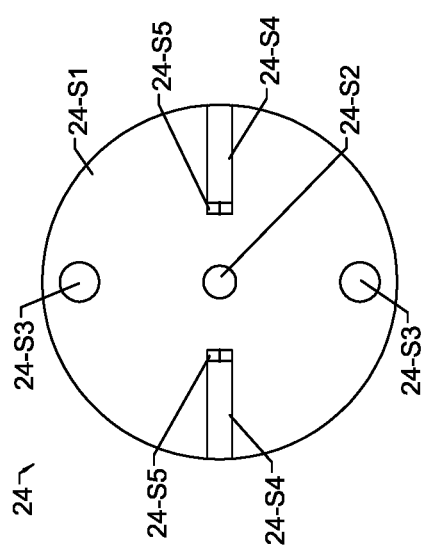
FIG. 52 shows a left-end-view of Follower Mechanism 24.
Figure 53:
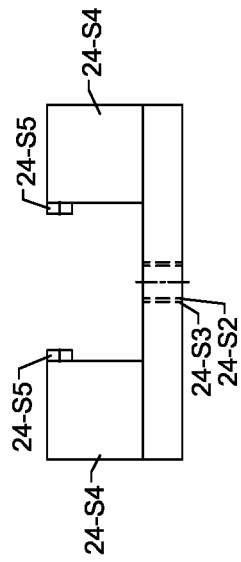
FIG. 53 shows a front-view of Follower Mechanism 24 when Follower Mechanism 24 is oriented as shown in FIG. 52.

Follower Mechanism 24 is shown in FIGS. 51 to 53. FIG. 51 shows a front-view of Follower Mechanism 24, FIG. 52 shows a left-end-view of Follower Mechanism 24, and FIG. 53 shows a front-view of Follower Mechanism 24 when Follower Mechanism 24 is oriented as shown in FIG. 52.

Follower Mechanism 24 comprises of a Follower Disk 24-S1, which has a centric Spline Hole 24-S2 and two non-centric Rod Holes 24-S3. And fixed to the rear surface of Follower Disk 24-S1 are two oppositely positioned Follower Attachment Bars 24-S4; on which each a Follower 24-S5 is fixed. Each Follower 24-S5 is shaped like a short round bar.

Spline Hole 24-S2 is for the insertion of Spline 21, on which Follower Disk 24-S1 can smoothly and securely rotate. Rod Holes 24-S3 are for the insertion of Rods 27-S3 of Torsion Plate 27. One Follower Attachment Bar 24-S4 is used to position one Follower 24-S5 in Front Outer Spiral Groove 23-S2; and the other Follower Attachment Bar 24-S4 is used to position the other Follower 24-S5 in Back Outer Spiral Groove 23-S6.

The axial position of Follower Mechanism 24 depends on the rotational position of Follower Mechanism 24, which in-turn depends on the amount of deflection of Spring 26 due to the torque that is transmitted by Cone 25. The axial position of Follower Mechanism 24 depends on the rotational position of Follower Mechanism 24 because of the engagement of Follower 24-S5 with their respective Inner Spiral Grooves (Front Inner Spiral Groove 23-S4 and Back Inner Spiral Groove 23-S8) of Spiral 23.

Since Cone 25 can slide freely relative to Spline 21, it is forced towards Follower Mechanism 24 by the tension of its Transmission Belt, so that Cone 25 is axially constrained relative to Follower Mechanism 24. Because of this, the torque transmitted by Cone 25 will determine the axial position of Cone 25, and as such the "Cone Diameter Increase Compensation" provided by Transmission Diameter Compensating Mechanism 19 of this section. If desired, Cone 25 can also be axially and rotatably constrained/fixed relative to Follower Mechanism 24 through gluing, screwed connections, etc.

Details of Individual Parts—Cone 25

Figure 56:
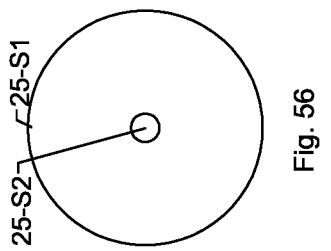
FIG. 56 shows a right-end-view of Cone 25, for which only Front Cover 25-S1 is shown.

Cone 25 is shown in FIGS. 54 to 56. It has a Front Cover 25-S1, which has a centric Spline Hole 25-S2. Spline Hole 25-S2 is for the insertion of Spline 21, on which Front Cover 25-S1 can smoothly and securely rotate and slide axially.

Cone 25 also has a Rear Cover 25-S3. Rear Cover 25-S3 has a centric Spline Hole 25-S5. Spline Hole 25-S5 is for the insertion of Spline 21, on which Rear Cover 25-S3 can also smoothly and securely rotate and slide axially. In addition, Rear Cover 25-S3 also has two non-centric Rod Holes 25-S4, which are for the insertion of Rods 27-S3 of Torsion Plate 27 as described previously.

Method of Changing the Transmission Diameters of the Cones in Increments Specifically Selected for Each Transmission Diameter and Transmission Ratio For the Driving Cone and Driven Cone, there are variation in "Transmission Belt Teeth Compression" at different Transmission Diameters; since for a Smaller Transmission Diameter the pressure of the Transmission Belt is dispersed over a smaller area than for a Larger Transmission Diameter.

Said "Transmission Belt Teeth Compression" variation can affect the Transmission Diameter of a Transmission Belt. A larger compression will compress the Teeth of a Transmission Belt more, so that its Transmission Belt is positioned at a lower height, so as to reduce its Transmission Diameter, Here changing the Transmission Diameter of a Cone at fixed interval, as is ideal when there is no "Transmission Belt Teeth Compression" variation at different Transmission Diameters, can cause tooth misalignment during re-engagement of a Torque Transmitting Member with its Transmission Belt.

In addition, for a CVT for which the Tensioning Pulley is positioned on the slack-side of its Transmission Belt, such as the CVT shown in FIG. 5; for the Driven Cone; there are also variation in "slack-side Transmission Belt stretching" at different Transmission Ratios (which depends on the "Transmission Diameter of the Driving Cone" and the "Transmission Diameter of the Driven Cone"). This is especially true if the axial positions of the Cones are changed independently as according to the method described in European Patent EP2764279; since for this method, slack needs to be provided or removed depending on whether the axial position of the Cones are "aligned" or "not aligned" for their current Transmission Ratio. And this can cause the tension in the slack side of the Transmission Belt to vary significantly between different Transmission Ratios; since the angles at which the Transmission Belt approaches and leaves its Tensioning Pulley can vary significantly between when slack needs to be provided and when slack needs to be removed.

In order to eliminate/minimize "tooth misalignment during re-engagement" due to "Transmission Belt Teeth Compression" variation at different Transmission Diameters, the following method of can be used for the Driving Cone: Changing/selecting the Transmission Diameters of the Driving Cone in increments that depends on the current Transmission Diameter of the Driving Cone. For example, the Transmission Diameters of a Driving Cone can be selected as follows: 4.00 inches, 4.25 inches (0.25 in. increment increase), 4.4375 inches (0.1875 in, increment increase), 4.5625 inches (0.125 in, increment increase), and so-forth. The ideal profile for changing/selecting the Transmission Diameters of the Driving Cone, which depends on the axial position of said Driving Cone, can be obtained experimentally or mathematically.

For the Driven Cone, the ideal "axial position changing increment"/"Transmission Diameter changing increment" of the Driven Cone depends on both the "Transmission Diameter of the Driving Cone" and the "Transmission Diameter of the Driven Cone". Since both the "Transmission Diameter of the Driving Cone" and the "Transmission Diameter of the Driven Cone" determine the tension in the slack-side of the Transmission Belt; since they both determine whether the Cones are "aligned" or "not aligned", and the angles at which the Transmission Belt approaches and leaves its Tensioning Pulley.

In order to eliminate/minimize the "tooth misalignment during re-engagement" due to "Transmission Belt Teeth Compression" variation and "slack-side Transmission Belt stretching" variation at different Transmission Diameters; the following method can be used for the Driven Cone: Changing/selecting the Transmission Diameters of the Driven Cone in increments that depends on the "current Transmission Diameter of the Driving Cone" and the "current Transmission Diameter of the Driven Cone".

An example of how the Transmission Diameter of a Driven Cone can be changed so as to minimize "tooth misalignment during re-engagement", is as follows: a) when the Transmission Diameter of the Driving Cone is 4.00 inches and the Transmission Diameter of the Driven Cone is also 4.00 inches, then the Transmission Diameter of the Driven Cone is increased by a 0.25 inch increment to 4.25 inches; b) when the Transmission Diameter of the Driving Cone is 4.25 inches and the Transmission Diameter of the Driven Cone is also 4.25 inches, the Transmission Diameter of the Driven Cone is increased by a 0.1875 inch increment to 4.4375 inches; and c) when the Transmission Diameter of the Driving Cone is 4.4375 inches and the Transmission Diameter of the Driven Cone is also 4.4375 inches, the Transmission Diameter of the Driven Cone is increased by a 0.125 inch increment to 4.5625 inches; and so-forth. The ideal profile for changing/selecting the Transmission Diameters of the Driven Cone, which depends on the axial position of the Driving Cone and the axial position of said Driven Cone, can be obtained experimentally or mathematically.

It is possible to change the Transmission Ratio in a manner so that the "Transmission Diameter of the Driving Cone" is always the same for a given "Transmission Diameter change" of the driven Cone. If this is the case, then the "Transmission Diameter of the Driven Cone" should also be changed/selected in increments that only depend on the "Transmission Diameter of the Driven Cone".

The method of this section requires that that the "fixed increment movements" of an "axial position changing mechanism" are converted into "variable increment movements". A mechanism that can be used to convert the "fixed increment movements" of an "axial position changing mechanism" into "variable increment movements" is described in the section below.

Mover Sliding Plate Mechanism for Converting Fixed Interval Movements to Required Interval Movement for Moving a Cone The axial position of a cone can be changed quickly and accurately using a "Transmission Ratio Changing Mechanism" described in the "Transmission Ratio Changing Mechanisms" section of U.S. Pat. No. 9,958,064, preferably a "Lever Indexing Mechanism 2".

The movements provided by a "Transmission Ratio Changing Mechanism" is fixed, while the required axial movements for a Cone from one Transmission Diameter that allows for optimal engagement to the next Transmission Diameter that allows for optimal engagement might change with the change in the Transmission Diameter of its Cone. If so, in order to have a "Transmission Ratio Changing Mechanism" provide the required amount of axial movements for a Cone, a "Mover Sliding Plate Mechanism", described in this section can be used.

A "Mover Sliding Plate Mechanism" that can be used to control the axial position of a Cone is shown as a partial side-view in FIGS. 57 and 58, as a partial front-view in FIG. 59, and as a partial top-view in FIG. 60. It comprises of two parallel Sliding Plates 33 that are constrained so that they can only be moved in the up-&-down directions shown in FIG. 57. The position of one Sliding Plate 33 relative to the other is fixed through the use of a Connector Plate 34 so that the Sliding Plates 33 are always aligned such that the Mover Pins 35, which end portions slide in Slot 33-S1 of a Sliding Plate 33, are always perpendicular to Sliding Plates 33.

In FIGS. 57 to 60, Connector Plate 34 is welded to Sliding Plates 33 for simplicity in describing the mechanism. Obviously here and in all other parts of this description where applicable, other methods for connecting/joining/attaching can be used. For example, here fasteners such as bolts, nuts, locking rings, etc., can be used for ease of assembly and disassembly and to prevent warping; or gluing can also be used.

A Mover Rod 36 is shown in FIGS. 61 to 63. Mover Rod 36 has a hole near its rear-end; into which a Mover Pin 35 is tightly inserted; in a manner so that Mover Pin 35 extends to the sides of Mover Rod 36, and so that Mover Pin 35 is fixed relative Mover Rod 36. And at the front-end of Mover Rod 36, a Mover Connector 37 is fixed.

Mover Pin 35 is a long slender cylinder that has a Locking Ring Groove shaped near each of its ends (see FIG. 62).

Mover Connector 37 is a slender bar that has a hole through which the front-end of Cone 38 (which is sliding on a Spline 44) can be slid in and secured for axial (but not rotational) movements relative to Mover Connector 37 using a Locking Ring 39. Because of Mover Rod 36, the axial position of Cone 38 is dependent on the axial position of Mover Pin 35.

The engagement of Mover Pin 35 with Slots 33-S1 of Sliding Plates 33 are used to convert the "Fixed Interval Up-&-Down Movements" of Sliding Plates 33 into "Variable Interval Axial Movement" of Cone 38.

FIGS. 57 and 58 might not accurately show the shape of Slots 33-S1. The exact shape for Slots 33-S1 can be obtained through experimentation, mathematics, engineering, and so forth.

In order to limit the movements of the Mover Pin 35, and hence also the movements of the Mover Rod 36, to horizontal movements (see FIG. 57), two parallel Horizontal Movement Plates 40 that each has a Horizontal Slot are used (see FIGS. 58 to 60). Horizontal Movement Plates 40 are aligned and fixed to a non-moving part of the CVT, such as the housing of the CVT for example, in manner such that Mover Pins 35, which end portions each slide in a Horizontal Slot of a Horizontal Movement Plate 40, are always horizontal.

Mover Rod 36 is positioned between the parallel Sliding Plates 33 and the parallel Horizontal Movement Plates 40 (see FIGS. 59 and 60). In order to secure Mover Rod 36 to Sliding Plates 33 and Horizontal Movement Plates 40, two Locking Rings 41 that sandwich the Horizontal Movement Plates 40 are used (see FIGS. 59 and 60); here each Locking Ring 41 is inserted into a Locking Ring Groove of Mover Pin 35 (see FIG. 62).

It is recommended that friction between the slots of "Sliding Plates 33 and Horizontal Movement Plates 40" and "Mover Pins 35" is minimized; and it is also recommended that friction between "Locking Rings 41" and "Sliding Plates 33" is minimized; this can be achieved by making or coating Sliding Plates 33 and Horizontal Movement Plates 40 with a low friction material, or submerging the mechanism in oil.

In order to move the Sliding Plates 33 in the up & down directions shown in FIG. 57, a "gear rack drive" can be used. In FIGS. 57 & 60, a "gear rack drive" that has a Gear 42 and a Gear Rack 43, which is fixed to a Sliding Plate 33, is used to move the Sliding Plates 33 in the up & down directions shown in FIG. 57. A transmission ratio changing mechanism described in the "Transmission Ratio Changing Mechanisms" section of U.S. Pat. No. 9,958,064, preferably a "Lever Indexing Mechanism 2", can be used to provide the rotational input for the Gear 42. The rotational input for the Gear 42 can also be provided by other means such as a stepper motor for example.

Each Sliding Plate 33 has two parallel Vertical Guides 45 (see FIGS. 58 & 60), which sandwich the side surfaces of Sliding Plates 33. Vertical Guides 45 are used to constrain the movements of Sliding Plates 33 to the up & down directions. It is preferably to keep friction between the side surfaces of the Sliding Plates 33 and the constraining surfaces of Vertical Guides 45 to a minimum.

Transmission Belt Constraining and Tensioning Method

Figure 64:
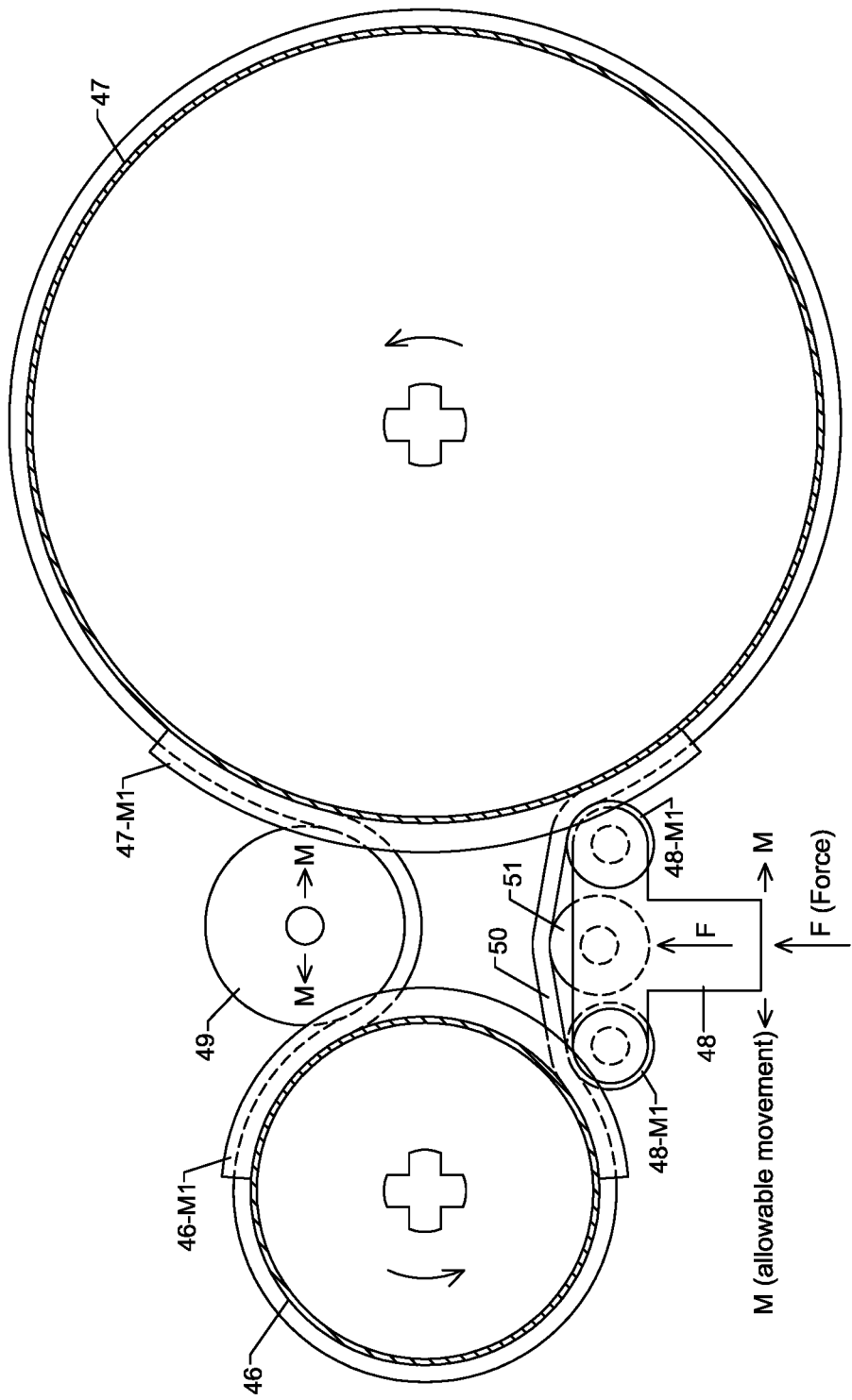
FIG. 64 shows a partial front-view of a CVT that is constructed of out of two "cone with one torque transmitting member", which uses the "Transmission Belt Constraining Method". Similar to FIGS. 1 and 3, in FIG. 64 the cones are cut (so as to remove the surfaces in front of said cut) at an axial-line selected so as to show the current torque transmitting member resting surfaces of the cones. In addition, all other surfaces of the cones, besides the current torque transmitting member resting surfaces of the cones, are not shown.
Figure 65:
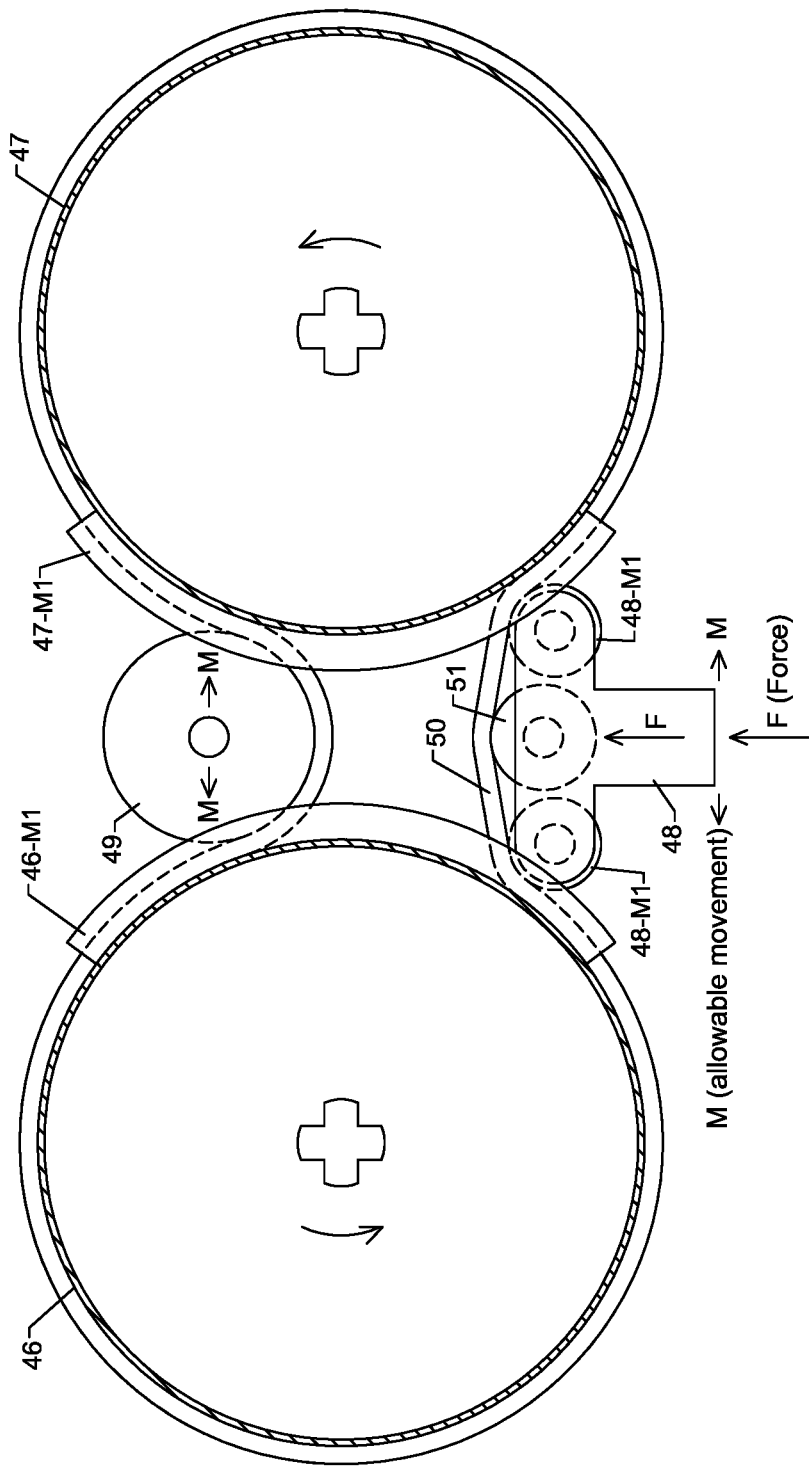
FIG. 65 shows another partial front-view of a CVT that is constructed of out of two "cone with one torque transmitting member", which uses the "Transmission Belt Constraining Method". The CVT shown in FIG. 65 is at a different transmission ratio than the CVT shown in FIG. 64. Similar to FIGS. 1 and 3, in FIG. 65 the cones are cut (so as to remove the surfaces in front of said cut) at an axial-line selected so as to show the current torque transmitting member resting surfaces of the cones. In addition, all other surfaces of the cones, besides the current torque transmitting member resting surfaces of the cones, are not shown.

The "Transmission Belt Constraining Method" for a CVT that comprises of a "Cone with One Torque Transmitting Member" that is coupled by a Transmission Belt to another "Cone with One Torque Transmitting Member" is shown in FIGS. 64 and 65. If desired, each "Cone with One Torque Transmitting Member" can be replaced with a "Cone with One Torque Transmitting Member and One Non-Torque Transmitting Member".

The main purposes/advantages of the "Transmission Belt Constraining Method" are as follows: a) the Constrainer Wheels 48-M1, which are on the slack-side of Transmission Belt 50, will partially or fully "remove and/or provide slack" due changing the axial position of the Cones independently as per the method described in European Patent EP2764279; and b) the Constrainer Wheel 48-M1 on the tense-side of Transmission Belt 50 will prevent teeth ratcheting at the "exit point"; which is the point where engagement between the teeth of Torque Transmitting Member 46-M1 and the teeth of Transmission Belt 50 ends; teeth ratcheting will most likely occur at the point of exit; this can allow for the usage of less pre-tension in the slack side of the Transmission Belt 50.

The CVT shown in FIGS. 64 and 65 comprise of a Driving Cone 46 (which has a Torque Transmitting Member 46-M1) that is coupled by a Transmission Belt 50 to a Driven Cone 47 (which has a Torque Transmitting Member 47-M1); in a manner so that the apex of Driving Cone 46 and the apex of Driven Cone 47 point in opposite directions (see configuration shown in FIG. 2). In order to constrain the slack-side of Transmission Belt 50, a Constrainer 48 is used. Constrainer 48 has two Constrainer Wheels 48-M1; one for pushing Transmission Belt 50 against Driving Cone 46, and one for pushing Transmission Belt 50 against Driven Cone 47. The Constrainer Wheels 48-M1 should push Transmission Belt 50 against their Cones hard enough, so that the "the portions of Transmission Belt 50" and "the portions of its Torque Transmitting Member or Non-Torque Transmitting Member" at the point of contact with Constrainer Wheels 48-M1 are always fully pushed against their Cone regardless how large the centrifugal forces are. Constrainer 48 should be mounted relative to its CVT so that it is pushed towards its CVT as described in the paragraph above. Here one or several spring(s) can be used. Constrainer 48 should also be allowed to move sideways, so that it can slide left or right as required during Transmission Ratio Change. But, Constrainer 48 should not be allowed to tilt, so as to ensure that Constrainer 48 is always positioned in the same position for each Transmission Ratio. Constrainer 48 should also be mounted so that its axial position relative to Transmission Belt 50 is fixed.

In order to provide the pretension for Transmission Belt 50, a Tensioning Pulley 51 is used. Tensioning Pulley 51 is mounted on Constrainer 48 so that it can only slide up and down relative to Constrainer 48; and Tensioning Pulley 51 is pushed up relative to Constrainer 48 by a spring or other means, so that it applies tension to Transmission Belt 50.

In order to constrain the tense-side of Transmission Belt 50, a Constrainer Wheel 49 is used. Constrainer Wheel 49 pushes Transmission Belt 50 against Driving Cone 46 and Driven Cone 47. Constrainer Wheel 49 should push Transmission Belt 50 against their Cones hard enough, so that the "the portions of Transmission Belt 50" and "the portions of its Torque Transmitting Member or Non-Torque Transmitting Member" at the point of contact with Constrainer Wheels 48-M1 are always fully pushed against their Cone regardless how large the centrifugal forces are.

Constrainer Wheel 49 should be mounted relative to its CVT so that it is pushed towards its CVT as described in the paragraph above. Here one or several springs can be used. Constrainer Wheel 49 should also be allowed to move sideways, so that it can slide left or right as required during Transmission Ratio Change. Constrainer Wheel 49 should also be mounted so that its axial position relative to Transmission Belt 50 is fixed.

"Tensioning and Constraining Mechanism" for "Transmission Belt Constraining and Tensioning Method"

Described In this section is a "Tensioning and Constraining Mechanism" that can be used for the "Transmission Belt Constraining and Tensioning Method" of the previous section.

Figure 67:
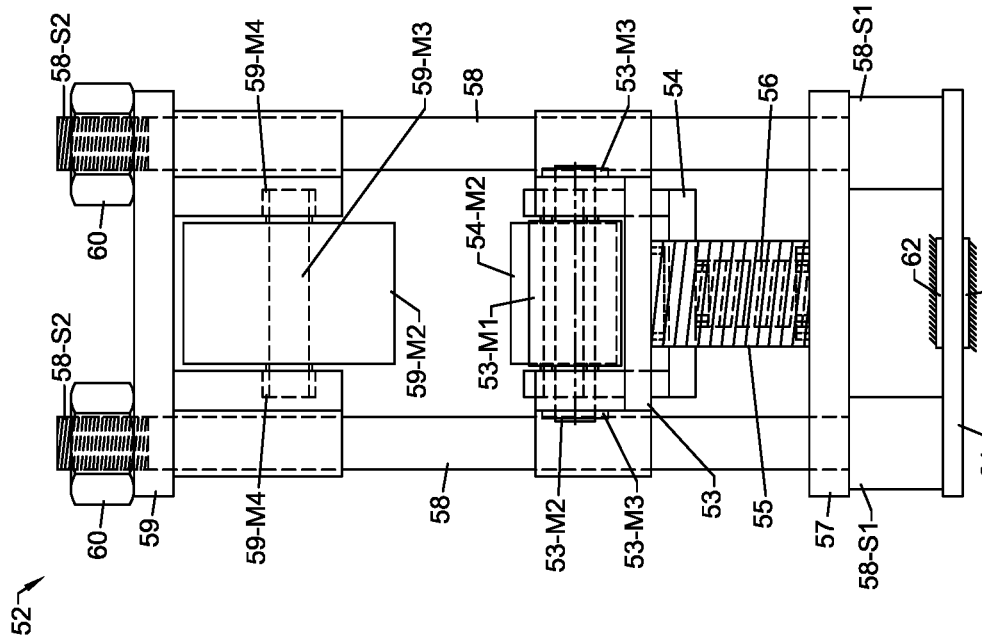
FIG. 67 shows a side-view of "Tensioning and Constraining Mechanism 52".
Figure 66:
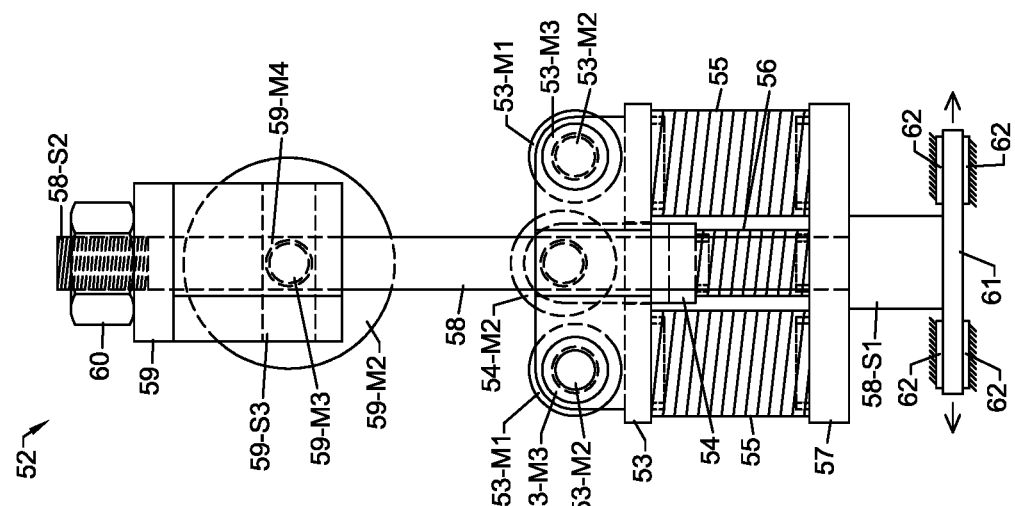
FIG. 66 shows a front-view of "Tensioning and Constraining Mechanism 52".

The "Tensioning and Constraining Mechanism", which is labeled as "Tensioning and Constraining Mechanism 52", is shown in FIGS. 66 and 67. It has a Constrainer 53, which performs the function of Constrainer 48 of FIGS. 64 and 65. Constrainer 53, which is shown in detail in FIGS. 68 to 71, has two Holes 53-S2 that are used to mount two Constrainer Wheels 53-M1, through the use of a Shafts 53-M2 and Locking Rings 53-M3. Locking Rings 53-M3 as well as other fasteners of this disclosure can be replaced with other fasteners, such as replacing nuts-and-bolts with locking rings and vice-versa for example. Constrainer Wheels 53-M1 perform the functions of Constrainer Wheels 48-M1 of FIGS. 64 and 65. Each Constrainer Wheel 53-M1 has a bearing which extends beyond the side surfaces of its pulley and engage with the sideways that cradle it (see FIG. 67).

Constrainer 53 also has two Vertical Slots 53-S3 that are used to slideably insert a Tensioning Pulley Slider Mechanism 54; in a manner such that Tensioning Pulley Slider Mechanism 54 is only allowed to slide vertically relative to Constrainer 53. Tensioning Pulley Slider Mechanism 54 has a Tensioning Pulley 54-M2, which performs the function of Tensioning Pulley 51 of FIGS. 64 and 65. Tensioning Pulley 54-M2 has a bearing which extends beyond the side surfaces of its pulley and engage with the sidewalls that cradle Tensioning Pulley 54-M2 (see FIGS. 67 and 73).

In order to push Constrainer 53 towards its Cones, Springs 55 are used. Springs 55 provide the compression force that pushes Constrainer 53 towards Constrainer Wheel Mounting Mechanism 59, so as to force Constrainer 53 and Constrainer Wheel Mounting Mechanism 59 toward the surfaces of their Cones. In order to achieve this, a Constrainer Push Plate 57, which is shown in detail in FIGS. 75 to 77, is positioned at the bottom-end of Springs 55 and is fixed vertically relative to Springs 55; so that Springs 55 are positioned between Constrainer 53 and Constrainer Push Plate 57, so as to force them apart, and as a result push Constrainer Push Plate 57 towards Constrainer Wheel Mounting Mechanism 59.

Constrainer 53 (see FIG. 71), Constrainer Push Plate 57 (see FIG. 76), and Constrainer Wheel Mounting Mechanism 59 (see FIG. 81), each has "two sleeves", or "two holes", or "two sleeves and two holes" through which a Connecting Rod 58 is inserted. Connecting Rod 58 is shown in FIG. 78, it is slender round rod that has a Connecting Rod Bottom 58-S1 and a Threaded End 58-S2.

The purpose of Connecting Rod 58 (which is fixed to a Base Plate 61) is to: a) fix the "bottom-end vertical position" and "horizontal position" of Constrainer Push Plate 57 relative to Base Plate 61; b) fix the "top-end vertical position" and "horizontal position" of Constrainer Wheel Mounting Mechanism 59 relative to Base Plate 61; and c) fix the horizontal position of Constrainer 53 relative to Base Plate 61, while allowing Constrainer 53 to slide vertically relative Constrainer Push Plate 57 and Constrainer Wheel Mounting Mechanism 59, as forced by Springs 55.

The "bottom-end vertical position" of Constrainer Push Plate 57 relative to Connecting Rod 58 is fixed through the engagement of Connecting Rod Bottoms 58-S1 with the bottom-surface of Constrainer Push Plate 57 (see FIGS. 66 and 67); and the "top-end vertical position" of Constrainer Wheel Mounting Mechanism 59 relative to Connecting Rod 58 is fixed through the engagements of a Nuts 60 (which are threaded onto Threaded Ends 58-S2) and the top surface of Constrainer Wheel Mounting Mechanism 59.

The engagement of Connecting Rod 58 with the holes and/or sleeves of Constrainer 53, Constrainer Push Plate 57, and Constrainer Wheel Mounting Mechanism 59 will fix the horizontal position of Constrainer 53, Constrainer Push Plate 57, and Constrainer Wheel Mounting Mechanism 59 relative to Connecting Rod 58, and as such also relative to Base Plate 61.

In order to allow Constrainer 53 to move sideways as required during Transmission Ratio Change, while preventing Constrainer 53 from tilting as required by the "Transmission Belt Constraining and Tensioning Method", the bottom-ends of Connecting Rod Bottoms 58-S1 are each fixed to a Base Plate 61, which is constrained to slide in the horizontal direction relative to a frame by Constraining Surfaces 62. In FIGS. 66 and 67, the bottom-ends of Connecting Rod Bottoms 58-S1 are each fixed to Base Plate 61 through gluing; obviously other methods of fixing can be used, such as by using fasteners such as bolts, nuts, threaded holes, etc.

In order to allow Constrainer Wheel 59-M2 of Constrainer Wheel Mounting Mechanism 59 to move sideways relative to Constrainer 53, so that it can slide left or right as required during Transmission Ratio Change, Slider Blocks 59-M4 are attached to the ends of a Shaft 59-M3 of Constrainer Wheel 59-M2. Slider Blocks 59-M4 are then inserted into Slots 59-S3 (see FIGS. 79 to 81) that allow Constrainer Wheel 59-M2 to slide sideways.

Details of Individual Parts—Constrainer 53

Constrainer 53 is shown in FIGS. 68 to 71. It has two Side Plates 53-S1 that are joined by two Bottom Plates 53-S4, which are separated by Vertical Slots 53-S3 (see FIG. 70). Each Side Plate 53-S1 has two Holes 53-S2 and a Vertical Slot 53-S3. Each pair of Holes 53-S2 from two facing Side Plates 53-S1 are used for inserting a Shaft 53-M2 on which a Constrainer Wheel 53-M1 is mounted (see FIGS. 66 and 67). And Vertical Slots 53-S3 are used to slideably insert Tensioning Pulley Slider Mechanism 54 as shown in FIGS. 66 and 67.

In addition, each Side Plate 53-S1 also has a Sleeve 53-S6, which is used to insert a Connecting Rod 58, as shown in FIGS. 66 and 67.

Each Bottom Plate 53-S4 has a Spring Holder 53-S5 shaped on its bottom-surface. Spring Holders 53-S5 are used to maintain the position of the top-end of Springs 55.

Details of Individual Parts—Tensioning Pulley Slider Mechanism 54

Tensioning Pulley Slider Mechanism 54 is shown in FIGS. 72 to 74. It has a Frame 54-M1 on which "a Shaft 54-M3 with a Tensioning Pulley 54-M2" is mounted.

Frame 54-M1 has two Side Plates that are joined by a Bottom Plate (see FIG. 73). Each said Side Plate has Hole 54-M1-S1 for Shaft 54-M3. And said Bottom Plate has Spring Holder 54-M1-S2 shaped at the center of its bottom-surface. Said Spring Holder 54-M1-S2 is used to maintain the position of the top-end of Spring 56.

Tensioning Pulley 54-M2 has a bearing which extends beyond the side surfaces of its pulley and engage with the sidewalls that cradle Tensioning Pulley 54-M2. And the axial position of Shaft 54-M3 is held in place by side walls of Vertical Slot 53-S3.

Details of Individual Parts—Constrainer Push Plate 57

Constrainer Push Plate 57 is shown in FIGS. 75 to 77. On the top-surface of Constrainer Push Plate 57 two Spring Holders 57-S1 and a Spring Holder 57-S2 are shaped. Spring Holders 57-S1 are used to maintain the position of the bottom-ends of Springs 55; and Spring Holder 57-S2 is used to maintain the position of the bottom-end of Spring 56.

In addition, Constrainer Push Plate 57 also has two Holes 57-S3, which each will be used to insert a Connecting Rod 58, as shown in FIGS. 66 and 67.

Details of Individual Parts—Constrainer Wheel Mounting Mechanism 59

Frame 59-M1 of Constrainer Wheel Mounting Mechanism 59 is shown in FIGS. 79 to 81. Frame 59-M1 has a Top Plate 59-S1 on which two parallel Side Plates 59-S2 are fixed. Each Side Plate 59-S2 has a Slot 59-S3; and to each Side Plate 59-S2, a Sleeve 59-S4 is fixed. Each Sleeve 59-S4 has a hole that is concentric with a Hole 59-S5 of Top Plate 59-S1.

Constrainer Wheel 59-M2 (which has a bearing which extends beyond the side surfaces of its pulley and engage with Slider Blocks 59-M4), its Shaft 59-M3, and its Slider Blocks 59-M4 are shown in FIGS. 82 and 83. In the assembled state of Constrainer Wheel Mounting Mechanism 59 each Slider Block 59-M4 is positioned inside a Slot 59-S3 (see FIGS. 79 to 81).

Alternate "Tensioning and Constraining Mechanisms"

Tensioning and Constraining Mechanism with no Tensioning Pulley

Figure 85:
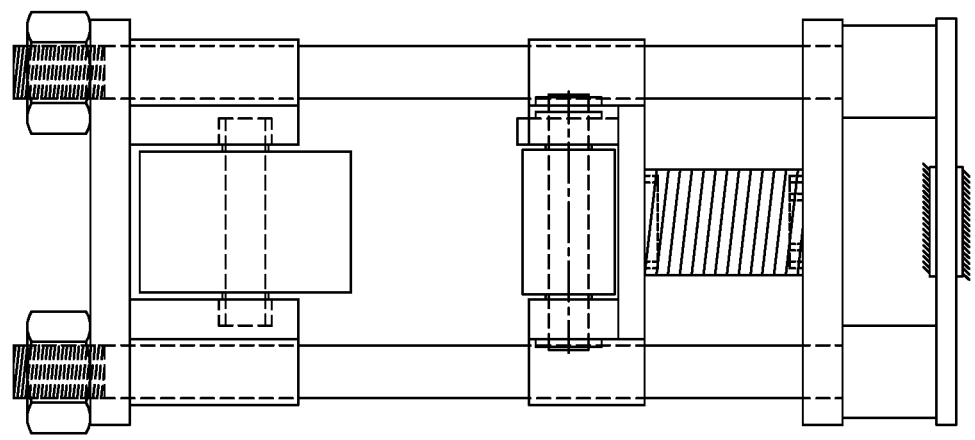
FIG. 85 shows a side-view of "Tensioning and Constraining Mechanism 52A".
Figure 84:
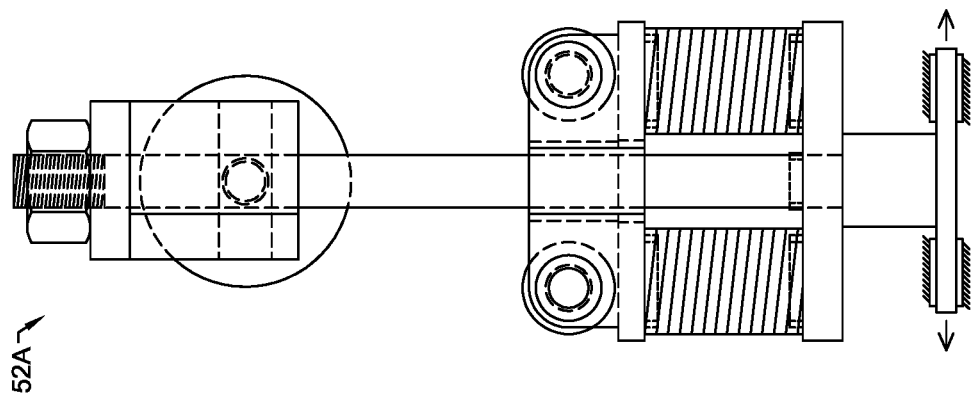
FIG. 84 shows a front-view of "Tensioning and Constraining Mechanism 52A"

A "Tensioning and Constraining Mechanism" that can be used instead of "Tensioning and Constraining Mechanism 52" is a "Tensioning and Constraining Mechanism 52A", which is shown in FIGS. 84 and 85.

"Tensioning and Constraining Mechanism 52A" is identical to "Tensioning and Constraining Mechanism 52", except that it does not have a Tensioning Pulley Slider Mechanism 54, and as such no Tensioning Pulley 54-M2.

"Tensioning and Constraining Mechanism 52A" can work if the "variation in slack in the slack-side of the Transmission Belt" due to "variation in pulling load" and/or "slack being removed/provided at different Transmission Ratios" can be kept acceptable with sufficient pre-tension and/or through the use of a Transmission Diameter Compensating Mechanism, such as Transmission Diameter Compensating Mechanism 10 or Transmission Diameter Compensating Mechanism 10A.

"Tensioning and Constraining Mechanism" for CVT 6 of U.S. Pat. No. 9,651,123

A CVT 6 uses two CVT 4's for which the Driving Cones of said CVT 4's are mounted on a common spline/shaft and the Driven Cones of said CVT 4's are also mounted on a common spline/shaft. For a CVT 6, the tension in the Transmission Belt for the CVT 4 for which the axial position of a Cone is changed can be reduced. In order to allow for this, both the Support Pulley and Tensioning Pulley of each CVT 4 need to provide/remove slack as needed during axial position changing of a Cone (refer to U.S. Pat. No. 9,651,123).

A CVT 4 to which the "Transmission Belt Constraining and Tensioning Method" is applied is shown in FIG. 86. It is identical to the "Transmission Belt Constraining and Tensioning Method" shown in FIG. 65, except for the following: a) It uses Tensioning Pulley 51A, which is configured so that it can remove and provide more slack than Tensioning Pulley 51; b) It uses a Transmission Belt 50A, which is longer than Transmission Belt 50 so that more slack can be removed and provided; and c) It uses a Support Pulley 49A instead of a Constrainer Wheel 49.

Support Pulley 49A is mounted so that it can move sideways as required during Transmission Ratio changes, and it is forced towards the surface of its Cones by a spring, gravity, or other means. Also unlike a Constrainer Wheel 49A, when its CVT 4 is used to transmit torque, Support Pulley 49A should not be pushing "sections of its Transmission Belt that are resting on the surfaces of their Cones" towards the "surfaces of said Cones". Here, Support Pulley 49A should be forced away from the surfaces of its Cone by the tension in its Transmission Belt until its Mounting 63 hits Stops 64; in a configuration so that Support Pulley 49A has sufficient range to move "towards" and "away from" the surfaces of its Cones when the tension in its Transmission Belt is reduced (refer to U.S. Pat. No. 9,651,123).

Figure 88:
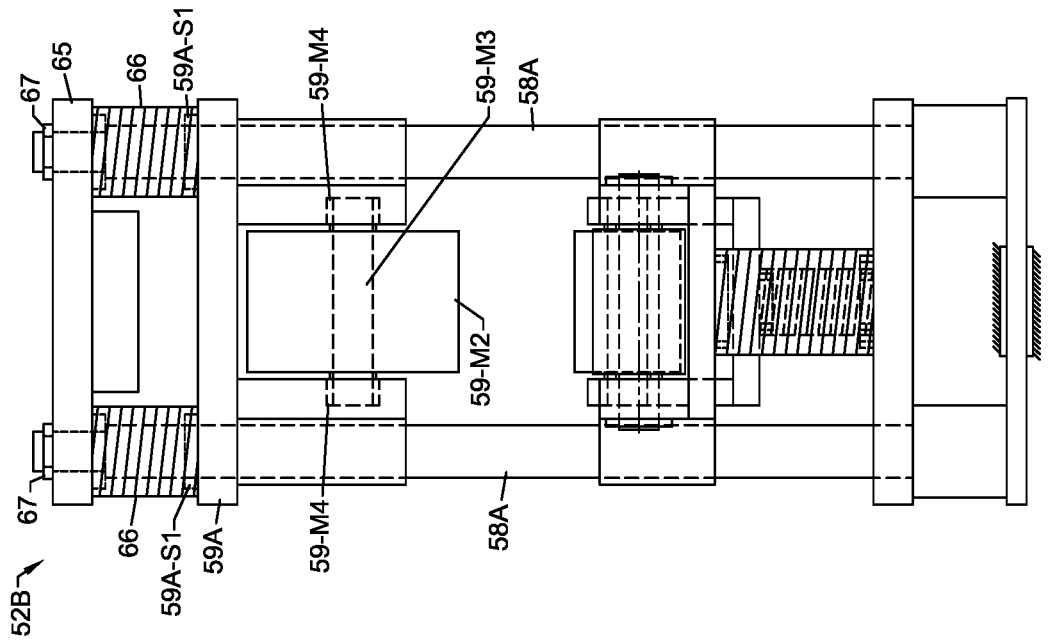
FIG. 88 shows a side-view of "Tensioning and Constraining Mechanism 52B".
Figure 87:
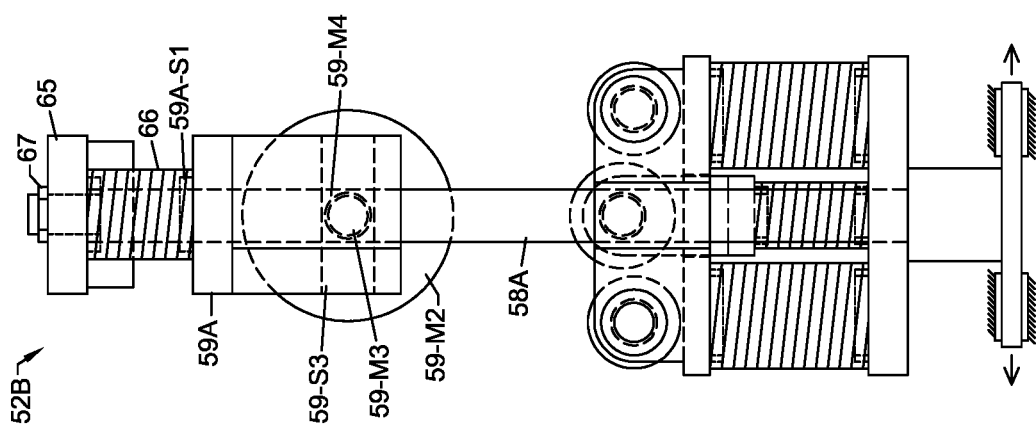
FIG. 87 shows a front-view of "Tensioning and Constraining Mechanism 52B"

A "Tensioning and Constraining Mechanism" for the "Transmission Belt Constraining and Tensioning Method" for a CVT 4, as shown in FIG. 86, is a "Tensioning and Constraining Mechanism 52B", which is shown in FIGS. 87 and 88.

"Tensioning and Constraining Mechanism 52B" is identical to "Tensioning and Constraining Mechanism 52", except that: a) Constrainer Wheel Mounting Mechanism 59 is replaced with Support Wheel Mounting Mechanism 59A; b) it uses two Connecting Rods 58A instead of two Connecting Rods 58; c) it has an additional Top Plate 65 which "vertical position" and "horizontal position" is fixed relative Connecting Rod 58A; and d) it has two Springs 66, which force Support Wheel Mounting Mechanism 59A away from Top Plate 65.

Support Wheel Mounting Mechanism 59A is identical to Constrainer Wheel Mounting Mechanism 59, except that two Spring Holders 59A-S1 are shaped on its top-surface (see FIGS. 87 and 88). Spring Holders 59-S1 are used to maintain the position of the bottom-end of Spring 66. Each Spring Holder 59-S1 is concentric with the hole for a Connecting Rod 58A.

A Connecting Rod 58A is shown in FIG. 89. Connecting Rods 58A are identical to Connecting Rods 58, except that: a) they are longer in order to account for Springs 66 and the slack that needs to be removed when the tension in their Transmission Belt is reduced; b) they have a Top-End 58A-S1, which has a smaller diameter than their main shaft (which are positioned below them); c) their Top-End each have a Locking Ring Groove 58A-S2 for a Locking Ring 67.

A Top Plate 65 is shown in FIGS. 90 to 92. Top Plate 65 has a Plate 65-S1 which has two Holes 65-S2. Concentric with Holes 65-S2 are two Spring Holders 65-S3; each Hole 65-S2 extends through the entire depth of Plate 65-S1 and its Spring Holder 65-S3.

Each Hole 65-S2 is for the insertion of a Top-End 58A-S1 of a Connecting Rod 58A; it should have the same dimension as Top-End 58A-S1 plus some required tolerances. Since the diameters of the main shafts of Connecting Rods 58A are larger than the diameters of Top-Ends 58A-S1, and such also the diameters of Holes 65-S2; the top-surfaces of the main shafts of Connecting Rods 58A are resting on the bottom surfaces of Spring Holders 65-S3 (see FIGS. 87 and 88 for assembly, and FIGS. 90 and 91 for labeling of individual shapes of Top Plate 65). Here the engagement of the bottom-surfaces of Spring Holders 65-S3 with the main shafts of Connecting Rods 58A will prevent Top Plate 65 from moving downwards relative to Connecting Rods 58A. And the engagement of the top-surface of Plate 65-S1 with Locking Ring 67, will prevent Top Plate 65 from moving upwards relative to Connecting Rods 58A (see FIGS. 87 and 88 for assembly, and FIGS. 90 and 91 for labeling of individual shapes of Top Plate 65).

Top Plate 65 also has a Stop 65-S4, which is shaped on the bottom-surface of Plate 65-S1. Stop 65-S4 performs the same function as Stops 64 of FIG. 86.

Preferred Embodiment of the Invention (Best Mode)

The preferred CVT of this disclosure is a CVT 6 (refer to U.S. Pat. No. 9,651,123) for which each CVT 4 uses the configuration and items shown in FIG. 86. For a CVT 6, the tension in the transmission belt for the CVT 4 for which the axial position of a cone is changed is reduced For the configuration shown in FIG. 86, the tensioning pulley, which is labeled as Tensioning Pulley 51A, is positioned on the slack side of the transmission belt; this will maintain the tension in the slack-side of Transmission Belt 50A almost constant in order to ensure smooth re-engagement of Driven Cone 47.

And in order to compensate for an increase in "Transmission Belt Teeth Compression" and an increase in "stretching of the tense side of the Transmission Belt" due to an increase in tension in the tense side of the Transmission Belt when an increased amount of torque is being transmitted by the CVT, so as to ensure smooth re-engagement of Driving Cone 46; Driving Cone 46 uses Transmission Diameter Compensating Mechanism 19 described in the "Transmission Diameter Compensating Mechanism with Adjustable Spiral" section of this disclosure.

In addition, the configuration shown in FIG. 86 also uses Constrainer 48 on the slack of its transmission belt in order to reduce/minimize changes of the "angles at which the Transmission Belt approaches and leaves its Tensioning Pulley" due to whether the Cones are "aligned and "not aligned" for their current Transmission Ratio, and/or due to other operational variations of the CVT; which will reduce variation in tension in the slack side of the Transmission Belt. In addition, Constrainer 48 also prevents teeth ratcheting at the point where engagement between the pulling Torque Transmitting Member and its Transmission Belt ends.

And in order to allow for the tension in the Transmission Belt of the CVT 4 for which the axial position of a Cone is changed to be reduced, the configuration shown in FIG. 86 also uses a Support Pulley 49A which can provide/remove "transmission belt slack" as needed during axial position changing of a Cone of its CVT 4 (refer to U.S. Pat. No. 9,651,123).

The preferred CVT of this disclosure also uses the "Method of changing the Transmission Diameters of the Cones in increments specifically selected for each Transmission Diameter and Transmission Ratio" in order to select the axial position changing increments/distances of its Cones. The "Method of changing the Transmission Diameters of the Cones in increments specifically selected for each Transmission Diameter and Transmission Ratio" is the preferred method of selecting the axial position changing increments/distances of the Cones of the CVT's of this disclosure.

ALTERNATE EMBODIMENTS

For all CVT's described in this disclosure a "Cone with one Torque Transmitting Member" can be replaced with a "Cone with two oppositely positioned Torque Transmitting Members".

FIG. 93 shows a CVT that is identical to the CVT shown in FIG. 5; except that Driving Cone 5 is replaced with a Driving Cone 5A, and Driven Cone 6C is replaced with a Driven Cone 6A.

Driving Cone 5 and Driven Cone 6C are each a "Cone with one Torque Transmitting Member"; while Driving Cone 5A and Driven Cone 6A are each a "Cone with two oppositely positioned Torque Transmitting Members". The Torque Transmitting Members of Driving Cone 5A, which are substantially, but not necessarily exactly opposite, are labeled as Torque Transmitting Members 5A-M1); and the Torque Transmitting Members of Driven Cone 6A, which are also substantially, but not necessarily exactly opposite, are labeled as Torque Transmitting Members 6A-M1).

Figure 94:
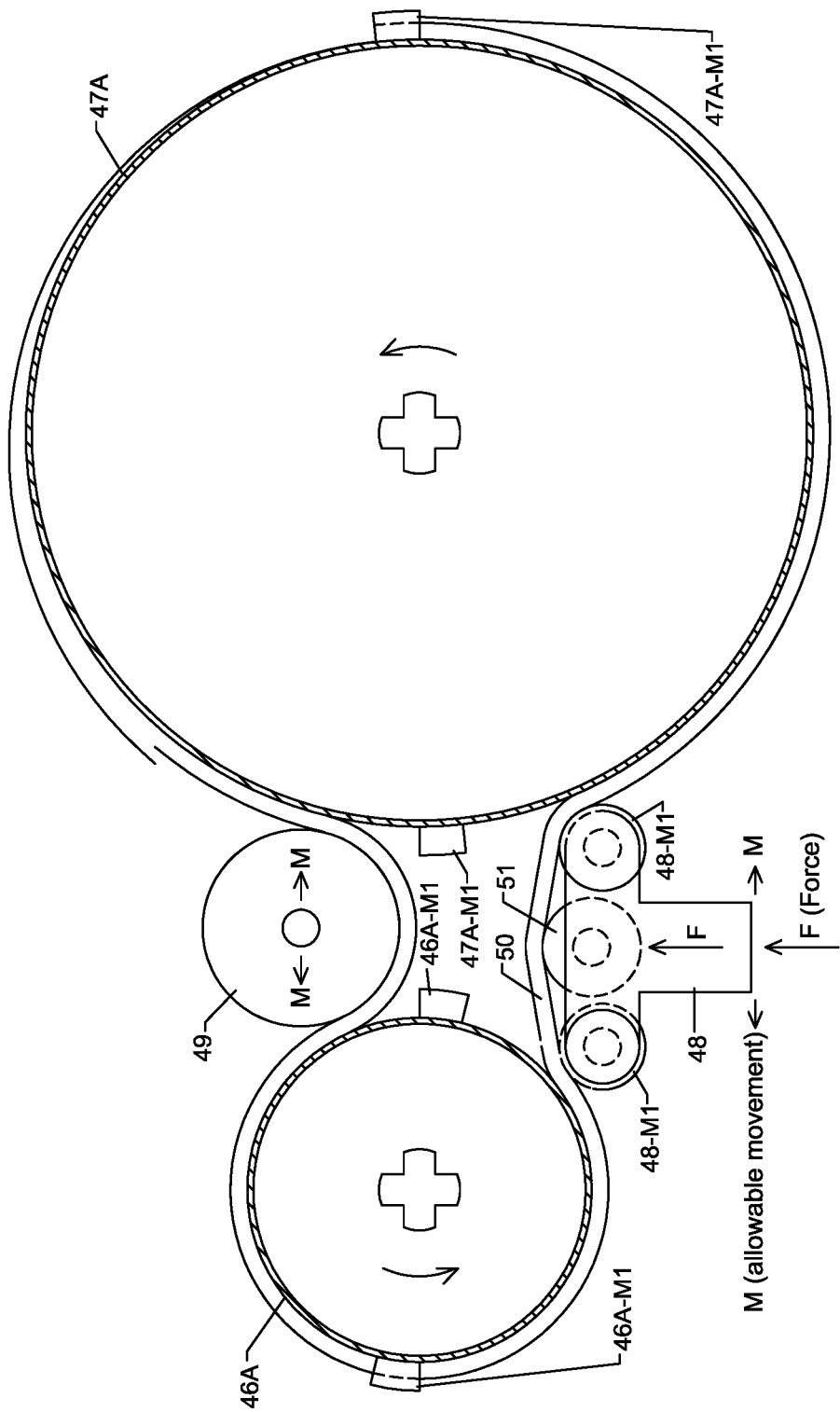
FIG. 94 shows a partial front-view of a CVT that is constructed out of two "cone with two oppositely positioned torque transmitting members", which uses the "Transmission Belt Constraining Method". Similar to FIGS. 1 and 3, in FIG. 94 the cones are cut (so as to remove the surfaces in front of said cut) at an axial-line selected so as to show the current torque transmitting members resting surfaces of the cones. In addition, all other surfaces of the cones, besides the current torque transmitting members resting surfaces of the cones, are not shown.

FIG. 94 shows a CVT that is identical to the CVT shown in FIG. 64; except that Driving Cone 46 is replaced with a Driving Cone 46A, and Driven Cone 47 is replaced with a Driving Cone 47A.

Driving Cone 46 and Driven Cone 47 are each a "Cone with one Torque Transmitting Member"; while Driving Cone 46A and Driven Cone 47A are each a "Cone with two oppositely positioned Torque Transmitting Members". The Torque Transmitting Members of Driving Cone 46A, which are substantially but not necessarily exactly opposite, are labeled as Torque Transmitting Members 46A-M1); and the Torque Transmitting Members of Driven Cone 47A, which are also substantially but not necessarily exactly opposite, are labeled as Torque Transmitting Members 47A-M1).

CONCLUSION, RAMIFICATIONS, AND SCOPE

While my above description contains many specificities, these should not be construed as limitations on the scope, but rather as an exemplification of one or several embodiment(s) thereof. Many other variations are possible.

Accordingly, the scope should be determined not by the embodiment(s) illustrated, but by the appended claims and their legal equivalents.

I claim:

1. A continuously variable transmission comprising:
    a) a driving cone, which is a cone with a single torque transmitting member having teeth; and
    b) a driven cone, which is a cone with a single torque transmitting member having teeth; and
    c) a transmission belt having teeth, said transmission belt operationally couples said driving cone and said driven cone by having said teeth of said transmission belt engaging the respective said teeth of said torque transmitting members of said driving cone and said driven cone;
    and an exit point is defined at a point where engagement between said teeth of said torque transmitting member of said driving cone and said teeth of said transmission belt ends; and
    d) a constrainer including first and second constrainer wheels, said first constrainer wheel is configured to push said transmission belt against said driving cone, and said second constrainer wheel is configured to push said transmission belt against said driven cone; and
    said constrainer further includes a tensioning pulley positioned on a slack side of said transmission belt and mounted on said constrainer, said tensioning pulley being configured to be able to slide axially towards and away from said transmission belt in order to selectively provide or remove slack to said transmission belt so as to maintain a substantially constant tension in said transmission belt;

wherein said first and second constrainer wheels are configured to maintain a substantially constant angle of engagement and disengagement between said transmission belt and said tensioning pulley; and wherein said first constrainer wheel is configured to prevent teeth ratcheting at said exit point.

\* \* \* \* \*